(12) United States Patent
Motoyama et al.

(10) Patent No.: US 11,812,197 B2
(45) Date of Patent: Nov. 7, 2023

(54) INFORMATION PROCESSING DEVICE, INFORMATION PROCESSING METHOD, AND MOVING BODY

(71) Applicant: SONY CORPORATION, Tokyo (JP)

(72) Inventors: Takuto Motoyama, Tokyo (JP); Yuki Yamamoto, Tokyo (JP); Masahiko Toyoshi, Tokyo (JP); Suguru Aoki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 259 days.

(21) Appl. No.: 17/250,541

(22) PCT Filed: Jul. 31, 2019

(86) PCT No.: PCT/JP2019/030064
§ 371 (c)(1),
(2) Date: Feb. 1, 2021

(87) PCT Pub. No.: WO2020/031812
PCT Pub. Date: Feb. 13, 2020

(65) Prior Publication Data
US 2021/0297633 A1    Sep. 23, 2021

(30) Foreign Application Priority Data

Aug. 9, 2018  (JP) .................................. 2018-150882

(51) Int. Cl.
| | |
|---|---|
| *B60W 30/095* | (2012.01) |
| *H04N 7/18* | (2006.01) |
| *G06T 7/50* | (2017.01) |
| *G06T 7/70* | (2017.01) |

(Continued)

(52) U.S. Cl.
CPC .............. *H04N 7/183* (2013.01); *G06T 7/40* (2013.01); *G06T 7/50* (2017.01); *G06T 7/70* (2017.01);

(Continued)

(58) Field of Classification Search
CPC .. H04N 7/183; H04N 5/38; G06T 7/40; G06T 7/50; G06T 7/70; G06T 11/001;
(Continued)

(56) References Cited

U.S. PATENT DOCUMENTS

| | | | |
|---|---|---|---|
| 2014/0038708 A1* | 2/2014 | Davison | A63F 13/69 463/31 |
| 2017/0341645 A1* | 11/2017 | Sugita | G06T 7/70 |

(Continued)

FOREIGN PATENT DOCUMENTS

| | | |
|---|---|---|
| JP | 2014-16858 A | 1/2014 |
| JP | 2017-13653 A | 1/2017 |

(Continued)

OTHER PUBLICATIONS

International Search Report and Written Opinion of PCT Application No. PCT/JP2019/030064, dated Oct. 15, 2019, 10 pages of ISRWO.

*Primary Examiner* — Howard D Brown, Jr.
(74) *Attorney, Agent, or Firm* — CHIP LAW GROUP

(57) ABSTRACT

Provided is an information processing device that includes an acquisition unit that acquires an image captured by an imaging unit, a recognition unit that recognizes attributes of an object shown in the image captured by the imaging unit, and a generation unit that generates a bird's-eye view map showing the attributes of the object on the basis of the image captured by the imaging unit and information on the attributes of the object recognized by the recognition unit.

20 Claims, 30 Drawing Sheets

(51) Int. Cl.
  *G06T 7/40* (2017.01)
  *G06T 11/00* (2006.01)
  *H04N 5/38* (2006.01)
  *G06V 20/58* (2022.01)
  *B60W 60/00* (2020.01)
  *B60W 50/08* (2020.01)

(52) U.S. Cl.
  CPC ............ *G06T 11/001* (2013.01); *G06V 20/58* (2022.01); *H04N 5/38* (2013.01); *B60W 50/08* (2013.01); *B60W 60/001* (2020.02); *B60W 2420/40* (2013.01); *G06T 2207/30261* (2013.01)

(58) Field of Classification Search
  CPC . G06T 2207/30261; G06T 7/73; G06V 20/58; B60W 50/08; B60W 60/001; B60W 2420/40; G05D 1/02
  See application file for complete search history.

(56) References Cited

U.S. PATENT DOCUMENTS

| | | | |
|---|---|---|---|
| 2018/0208196 A1* | 7/2018 | Kurata | G06V 20/584 |
| 2019/0217857 A1* | 7/2019 | Sorin | B60W 60/0023 |
| 2021/0072743 A1* | 3/2021 | Otaki | G05D 1/0027 |
| 2021/0255622 A1* | 8/2021 | Haynes | B60W 30/0956 |
| 2021/0276587 A1* | 9/2021 | Urtasun | G06N 3/08 |
| 2022/0180106 A1* | 6/2022 | Voodarla | G06N 3/08 |
| 2022/0228868 A1* | 7/2022 | Singh | G01S 13/867 |

FOREIGN PATENT DOCUMENTS

| | | |
|---|---|---|
| JP | 2017-41731 A | 2/2017 |
| JP | 2017-211909 A | 11/2017 |
| JP | 2017-218001 A | 12/2017 |

* cited by examiner

IMAGE BASIS

MAP BASIS

DEPTH

FIG.10
IMAGE
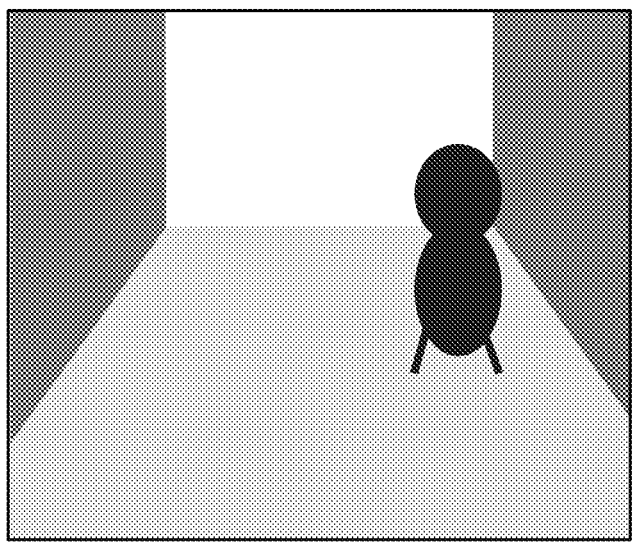
SEMANTIC SEGMENTATION
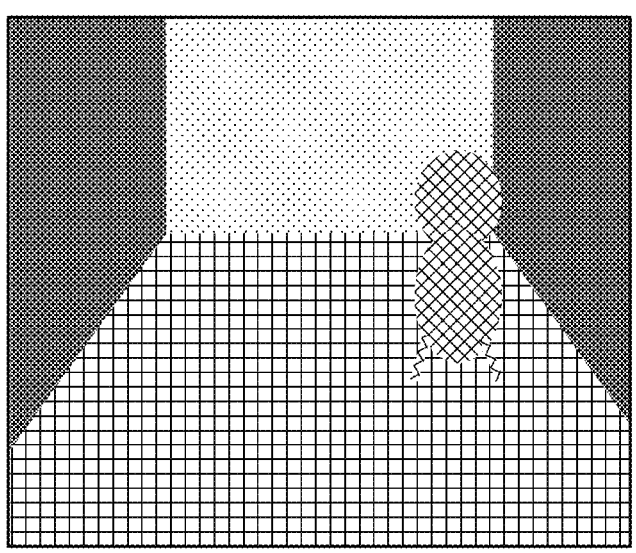
SEMANTIC LABEL IMAGE
⊠ : PERSON
⊞ : ROAD SURFACE
☐ : SKY
■ : STATIONARY STRUCTURE

FIG.11
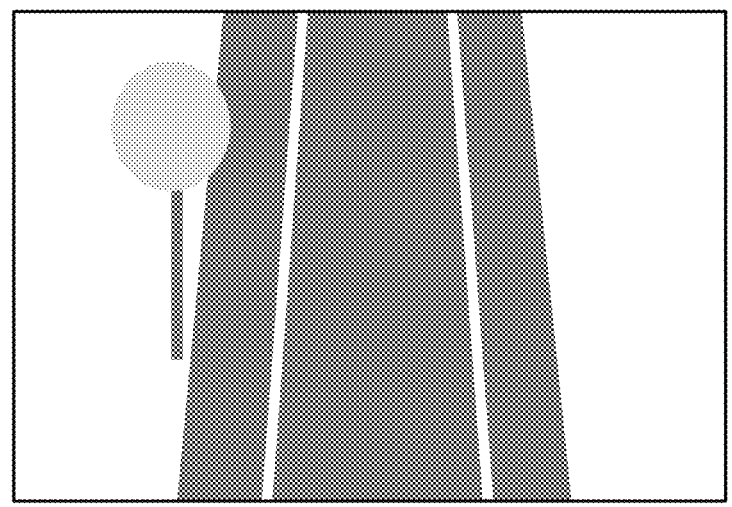
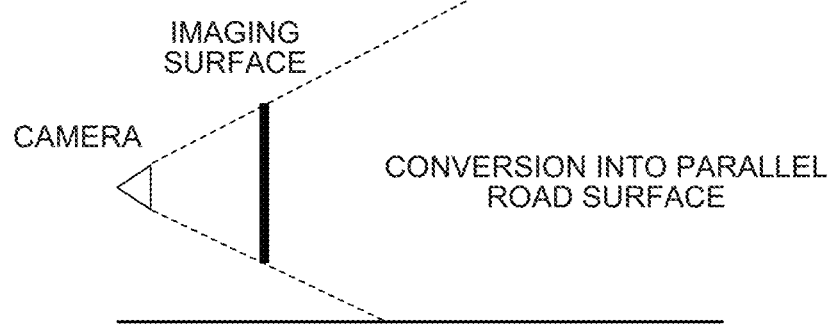
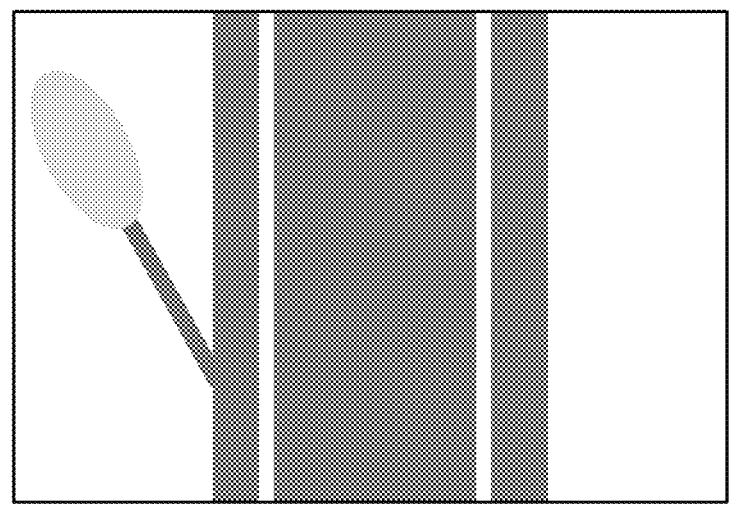

IMAGE RECOGNITION RESULT

TEXTURE MAP

Occupancy Grid Map

■ : OBSTACLE PRESENT
☐ : NO OBSTACLE
▨ : UNKNOWN

⊞ : ROAD SURFACE

☐ : NO INFORMATION

⊞ : ROAD SURFACE

◨ : SIDEWALK

☰ : SIGN

MOVING OBJECT TRACKING INFORMATION

LANDMARK INFORMATION

ROUTE INFORMATION

INFORMATION PROCESSING DEVICE, INFORMATION PROCESSING METHOD, AND MOVING BODY

CROSS REFERENCE TO RELATED APPLICATIONS

This application is a U.S. National Phase of International Patent Application No. PCT/JP2019/030064 filed on Jul. 31, 2019, which claims priority benefit of Japanese Patent Application No. JP 2018-150882 filed in the Japan Patent Office on Aug. 9, 2018. Each of the above-referenced applications is hereby incorporated herein by reference in its entirety.

FIELD

The present disclosure relates to an information processing device, an information processing method, an information processing program, and a moving body.

BACKGROUND

Research on moving bodies traveling autonomously (autonomous moving body) is in progress. The autonomous moving body is equipped with a sensor which recognizes surrounding objects and proceeds while avoiding obstacles by itself.

CITATION LIST

Patent Literature

Patent Literature 1: JP 2017-218001 A

SUMMARY

Technical Problem

Although a user wants to proceed while avoiding dirt or small falling objects on a road surface, there are things which cannot be recognized by sensors. In this case, the operation (for example, the avoidance operation) of the moving body is left to the decision of the user, but it is not easy to grasp the situation for instructing the operation of the moving body.

In this regard, the present disclosure proposes an information processing device, an information processing method, an information processing program, and a moving body which are easily to grasp the situation for instructing the operation of the moving body.

Solution to Problem

To solve the above problems, an information processing device according to the present disclosure includes: an acquisition unit that acquires an image captured by an imaging unit; a recognition unit that recognizes attributes of an object shown in the image captured by the imaging unit; and a generation unit that generates a bird's-eye view map showing the attributes of the object on a basis of the image captured by the imaging unit and information on the attributes of the object recognized by the recognition unit.

Advantageous Effects of Invention

According to the present disclosure, it is possible to easily grasp the situation for instructing the operation of the moving body. Incidentally, the effects described here are not necessarily limited and may be any of the effects described in the present disclosure.

BRIEF DESCRIPTION OF DRAWINGS

FIG. 10 is a diagram for describing the semantic segmentation.

FIG. 11 is a diagram for describing a general bird's-eye view conversion.

DESCRIPTION OF EMBODIMENTS

Hereinafter, embodiments of the present disclosure will be described in detail on the basis of the drawings. Incidentally, in each of the following embodiments, the same reference signs are given to the same portions, and duplicate description will be omitted.

The present disclosure will be described according to the order of items described below.

1. Introduction
2. First Embodiment
2-1. Configuration of information processing device
2-2. Functional configuration of information processing device
2-3. Map generation process
2-4. Avoidance process
3. Second Embodiment
4. Modification
5. Conclusion

1. INTRODUCTION

A moving body traveling autonomously (autonomous moving body) includes a sensor which recognizes surrounding objects. However, there are things, such as dirt on the road surface and small falling objects, which cannot be detected by the sensor. The dirt on the road surface and the small falling objects are not a problem for traveling of the moving body but are one of the things that a user wants to avoid when traveling. However, since dirt and small falling objects cannot be detected by the sensor, the autonomous moving body proceeds toward the dirt and small falling objects like this. In this case, the autonomous moving body becomes dirty or scratched.

In this regard, it is desirable to enable the user to intervene in the operation (for example, avoidance movement) of the autonomous moving body. For example, in a case where the user discovers dirt or small falling objects, it is desirable to enable the user to immediately change the route of the autonomous moving body. However, it is not easy for the user to immediately change the route of the autonomous moving body.

Figure 1:
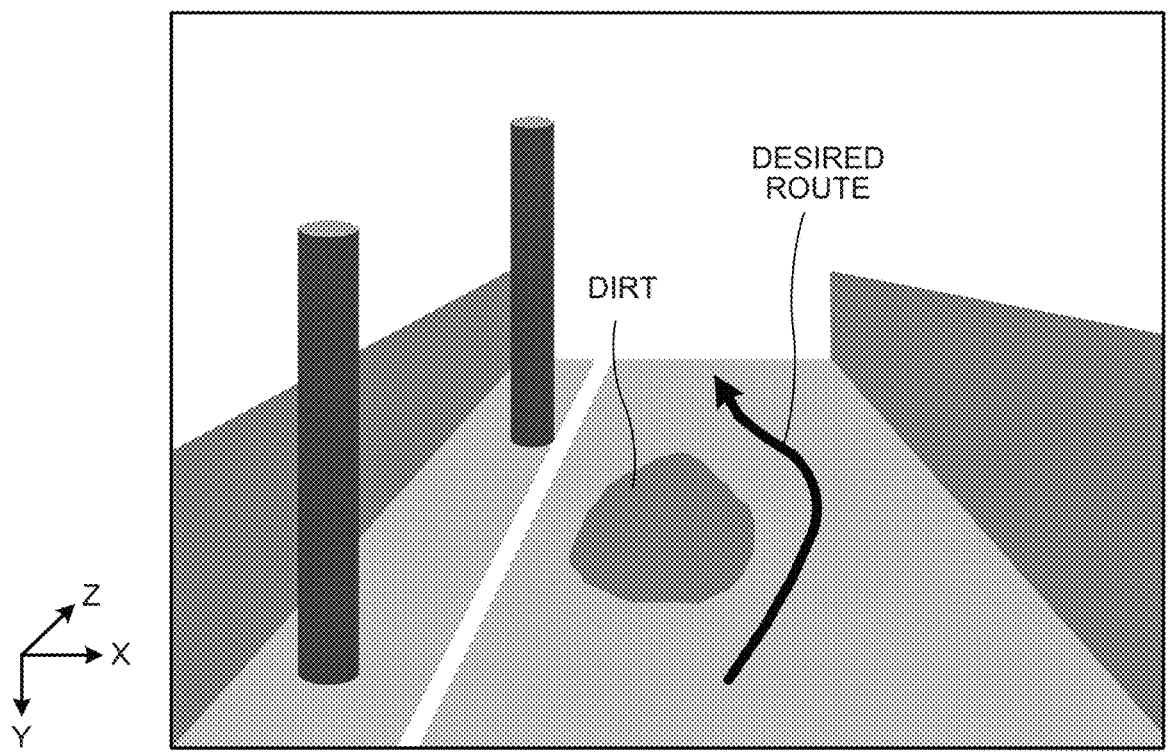
FIG. 1 is a diagram for describing an aspect in which a user instructs an operation of a moving body on an image basis.

FIG. 1 is a diagram for describing an aspect in which the user instructs the operation of the moving body on an image basis. More specifically, FIG. 1 is an image captured from the moving body. Incidentally, in the following description, it is assumed that the concept of an image includes not only a still image but also a moving image. Further, in the following description, the moving body is assumed to be an autonomous moving body. However, the moving body is not necessarily an autonomous moving body. Further, in the following description, an orthogonal coordinate system configured by an X-axis, a Y-axis, and a Z-axis is used. In the drawing, the direction indicated by an arrow is a positive direction. In the case of this embodiment, the X-axis and the Z-axis have an axial direction in a horizontal direction, and the Y-axis has an axial direction in a vertical direction. The Y-axis positive direction is downward.

In FIG. 1, dirt (for example, a puddle) on the road surface is shown in the image. In the case of the image basis, the user easily discovers the dirty area intuitively. In the case of FIG. 1, many users want to proceed with the moving body according to a desired route indicated in FIG. 1. However, the user cannot grasp the sense of distance on the image basis, and thus it is difficult for the user to instruct the route.

Figure 2:
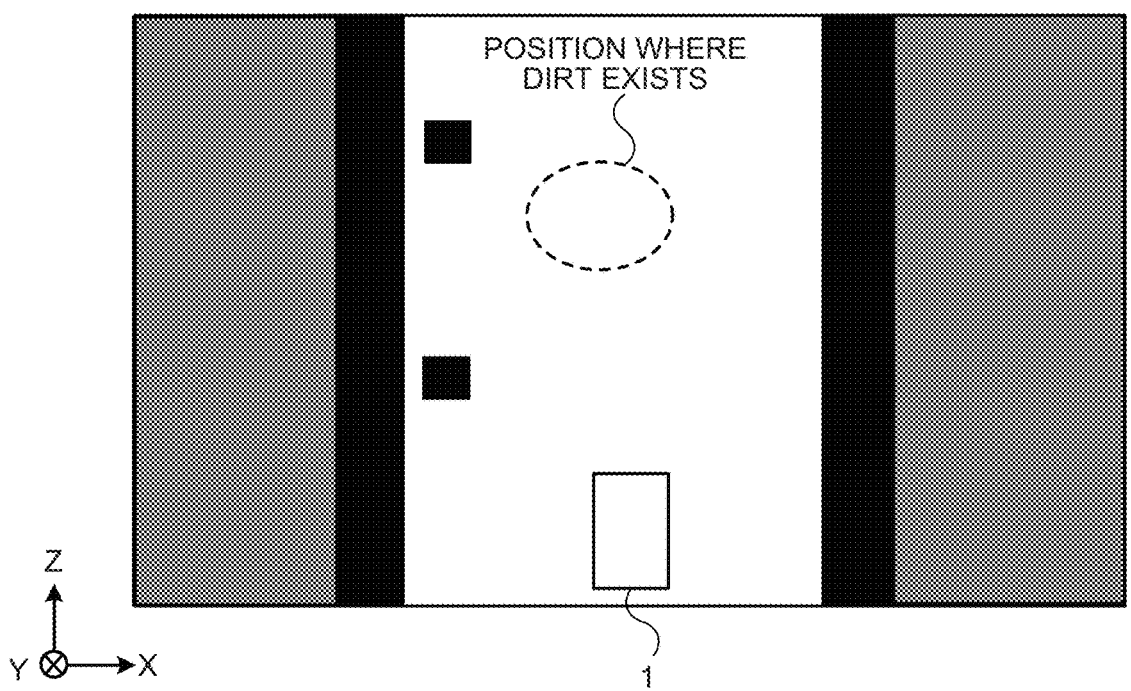
FIG. 2 is a diagram for describing an aspect in which the user instructs the operation of the moving body on a map basis.

FIG. 2 is a diagram for describing an aspect in which the user instructs the operation of the moving body on a map basis. More specifically, FIG. 2 is a diagram illustrating the vicinity of the moving body 1 which is an autonomous moving body when viewed down from the sky. For example, FIG. 2 is an Occupancy Grid Map using a depth sensor mounted on the moving body 1. The Occupancy Grid Map is a grid map for the presence or absence of obstacles. FIG. 2 is a grid map illustrating the vicinity of the moving body 1 when vertically viewed down from the sky. A place where there is an obstacle is black, a place where there is no obstacle is white, and a place where the presence or absence of obstacles is not determined is gray.

In the case of map basis, it is easy for the user to instruct the route of the moving body 1. However, in the case of map basis, the dirt area is not displayed on the map, and thus the user necessarily recognizes a dirt position on the map by oneself in comparison with the road surface which the user actually sees through a windshield. In the map basis, it is assumed that the user takes time to understand the situation. Therefore, even in the map basis, it is difficult for the user to instruct the route of the moving body 1.

In this regard, in this embodiment, the information processing device generates a bird's-eye view map showing the attributes of the object on the basis of the image captured from the moving body and the information on the attributes of the object shown in the image. The bird's-eye view map is a map having a bird's-eye view shape. Accordingly, the user can easily instruct the operation of the moving body.

Incidentally, the bird's-eye view is a view when viewed down in a predetermined range (for example, the moving body and/or the vicinity of the moving body) from the sky and typically is a view (a plan view or bird's-eye view) when viewed in the predetermined range directly down from the sky. Incidentally, the bird's-eye view is not necessarily a bird's-eye view (plan view). The bird's-eye view may be a view (a bird's-eye view in a narrow sense) when viewed down obliquely from the sky. In the following description, the concept of bird's-eye view includes not only a bird's-eye view in a narrow sense but also a bird's-eye view (plan view). Further, in the following description, the map expressed as a bird's-eye view may be referred to as a map having a bird's-eye view shape or a bird's-eye view map.

In this embodiment, an integrated map is generated as the bird's-eye view map. The integrated map is a map generated by integrating the texture map (first map) and the semantic map (second map). Here, the texture map is a map having a bird's-eye view shape in which the texture of the image captured by the camera is mapped on a plane. Further, the semantic map is a map having a bird's-eye view shape which is displayed such that the user can recognize the attributes of the object shown in the image. For example, the semantic map is a map having a bird's-eye view shape to which information (such as color) indicating the attributes of the object is added. As an example, the semantic map is a grid map in which the image (for example, cells with colors corresponding to the attributes) showing the attributes of the object are arranged in a bird's-eye view shape.

Figure 3:
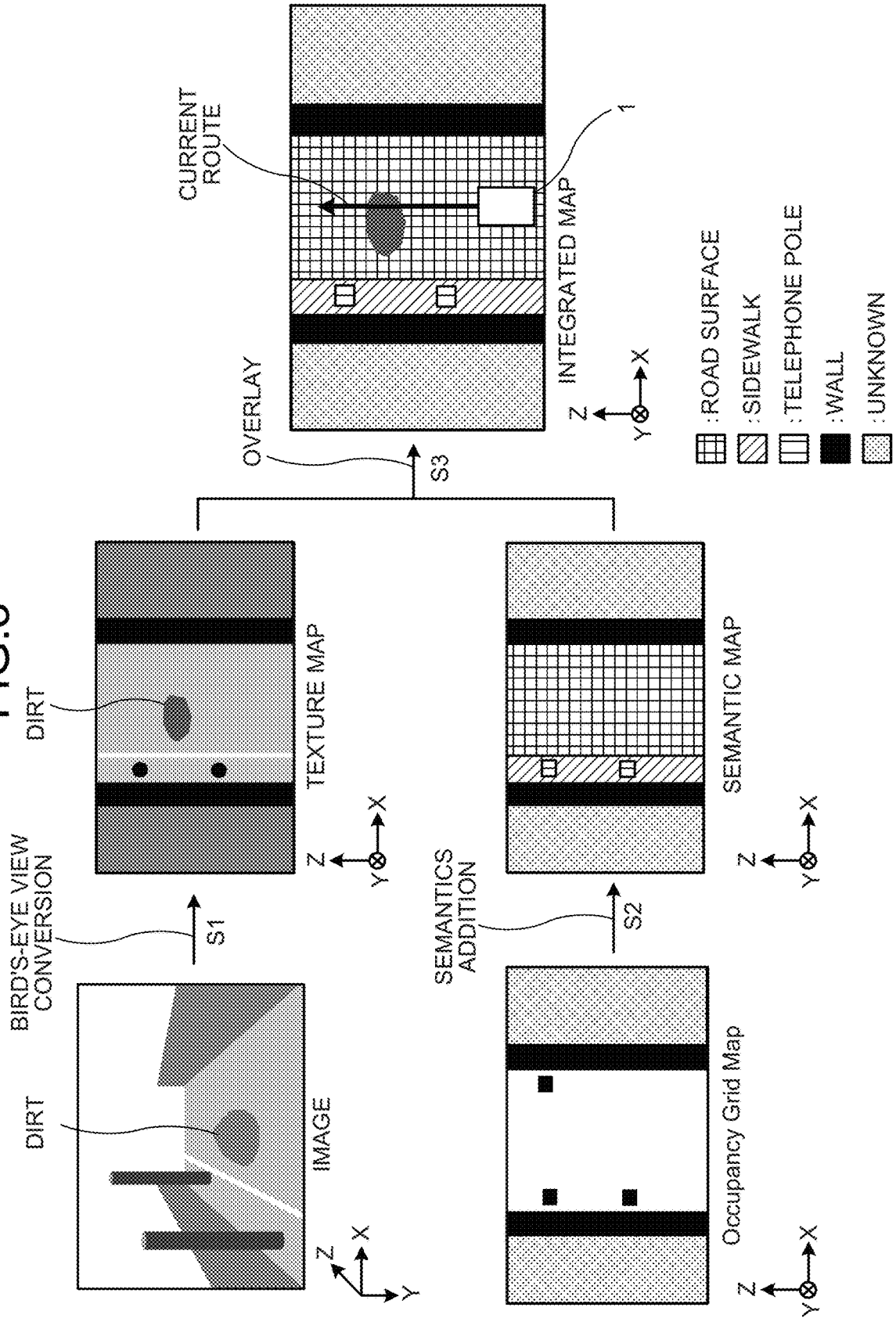
FIG. 3 is a diagram illustrating an outline of a generation process of an integrated map.

FIG. 3 is a diagram illustrating an outline of a generation process of the integrated map. The generation of the integrated map is executed by the information processing device mounted on the moving body 1. The information processing device is a control device (for example, a processor) of the moving body 1. Of course, the information processing device may be a device, such as a car navigation system or a smartphone, separate from the moving body 1.

Incidentally, in the following description, the moving body 1 is assumed to be an automobile, but the moving body 1 is not limited to the automobile. The moving body 1 may be a vehicle, such as a bus, a truck, a train, or a linear motor car, other than an automobile. Further, the moving body is not limited to a vehicle, and may be, for example, a ship such as a passenger ship, a cargo ship, or a hovercraft. Further, the moving body may be a submarine such as a submersible, a submarine, or an unmanned submarine. Further, the moving body 1 may be an aircraft such as an airplane, an airship, or a drone. The concept of the aircraft includes not only a heavy aircraft such as an airplane and a glider but also a light aircraft such as a balloon and an airship. Further, the concept of the aircraft includes not only the heavy aircraft and the light aircraft but also a rotorcraft such as a helicopter and an autogyro. Hereinafter, the outline of the generation process of the integrated map will be described with reference to FIG. 3.

First, the information processing device acquires an image captured by the camera mounted on the moving body 1. As described above, the moving body 1 is an autonomous moving body. Then, the information processing device generates a texture map by converting the image into a bird's-eye view (Step S1). Various methods can be used for bird's-eye view conversion. For example, the information processing device generates a texture map by mapping the texture of the image on a plane. An image of dirt viewed from the sky is shown in the texture map. With the texture map, the user can easily interact with the real world.

Next, the information processing device acquires the depth data measured by the depth sensor mounted on the moving body 1. The depth sensor is a sensor which measures a distance to an object. Further, the depth data is data including the distance (depth value) to the object. Then, the information processing device generates an Occupancy Grid Map on the basis of the depth data. Then, the information processing device generates a semantic map by adding semantics to the Occupancy Grid Map (Step S2).

For example, the semantics are the attributes (the meaning of the image area) of the object shown in the image. The information processing device recognizes the attribute of the object (image area) shown in the image by executing the semantic segmentation on the image captured by the camera. In the example of FIG. 3, a pattern (a pattern such as obliquely lines or horizontal stripes) indicating the attributes of the image area is added to the image area in the semantic map. Incidentally, the information indicating the attribute is not necessarily a pattern. For example, the information indicating the attribute may be a color. The semantic segmentation will be described later. With the semantic maps, the user can easily understand the positional relationship of landmarks (such as telephone poles, walls, and sidewalks).

Next, the information processing device generates an integrated map by integrating (for example, overlaying) the texture map (first map) generated in Step S1 with the semantic map (second map) generated in Step S2 (Step S3). As described above, the integrated map is a kind of bird's-eye view map. The information processing device generates an integrated map such that information (for example, a color or a pattern) indicating the attributes of the image area and a dirt image are included in the map. The information processing device may display an image showing the position of the moving body 1 and information (for example, an arrow) indicating the current route of the moving body 1 on the integrated map.

By viewing the integrated map, the user can easily grasp the positional relationship between the moving body 1 and the dirt. Therefore, the user can easily give an operation instruction to the moving body 1. Hereinbefore, the outline of the integrated map generation process executed by the information processing device has been described above. However, the configuration and operation of the information processing device will be described in detail below.

2. FIRST EMBODIMENT

First, an information processing device 10 according to a first embodiment will be described. For example, the information processing device 10 is a control device which is mounted on the moving body 1 and controls the operation of the moving body 1. The moving body 1 itself may be regarded as the information processing device 10. Further, the information processing device 10 may be an embedded device (for example, an embedded car navigation system) used to be fixed to the moving body 1 or a portable terminal device (for example, a smartphone).

Specific examples of the information processing device 10 include a car navigation device, a mobile phone, a smart device (smartphone or tablet), a personal digital assistant (PDA), and a personal computer. Incidentally, the information processing device 10 may be a head-up display, a navigation display, a machine to machine (M2M) device, or an Internet of things (IoT) device.

<2-1. Configuration of Information Processing Device>

Figure 4:
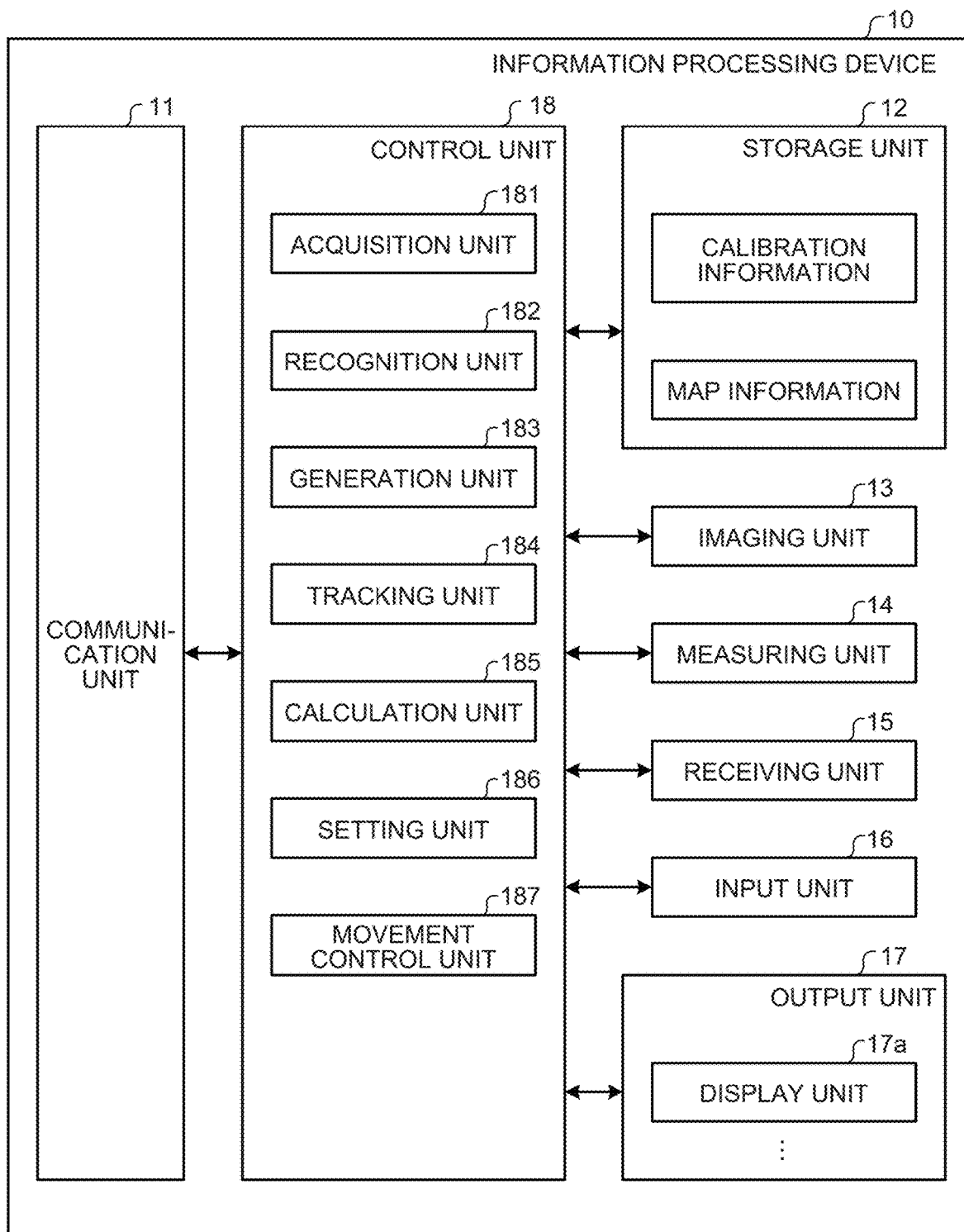
FIG. 4 is a diagram illustrating a configuration example of an information processing device according to an embodiment of the present disclosure.

First, the configuration of the information processing device 10 will be described. FIG. 4 is a diagram illustrating a configuration example of the information processing device 10 according to the embodiment of the present disclosure. The information processing device 10 includes a communication unit 11, a storage unit 12, an imaging unit 13, a measuring unit 14, a receiving unit 15, an input unit 16, an output unit 17, and a control unit 18. Incidentally, the configuration illustrated in FIG. 4 is a functional configuration, and the hardware configuration may be different therefrom. Further, the functions of the information processing device 10 may be distributed and implemented in a plurality of physically separated devices.

The communication unit 11 is a communication interface for communication with other devices. For example, the communication unit 11 is a local area network (LAN) interface such as a network interface card (NIC). The communication unit 11 may be a universal serial bus (USB) interface configured by a USB host controller, a USB port, and the like. Further, the communication unit 11 may be a wired interface or a wireless interface. For example, the communication unit 11 may be a wireless communication interface of a wireless LAN system or a cellular communication system. The communication unit 11 functions as a communication means or a transmission means of the information processing device 10. The communication unit 11 communicates with another device according to the control of the control unit 18.

The storage unit 12 is a storage device, such as a DRAM, an SRAM, a flash memory, and a hard disk, which can read and write data. The storage unit 12 functions as a storage means of the information processing device 10. The storage unit 12 stores calibration information, map information, and the like. The calibration information is information (calibration information) indicating the relationship between the output and the input of the measuring unit 14. The map information is a preliminary map for estimating the position (self-position) of the moving body 1. The map information includes landmark information indicating the positions of landmarks such as white lines and signs. For example, the landmark information is a white line/sign list indicating the position of a white line or a sign.

For example, the imaging unit 13 is a camera capable of capturing a moving image or a still image. For example, the imaging unit 13 is a stereo camera, a monocular camera, or an infrared camera. Of course, the imaging unit 13 may be a camera, such as a time of flight (ToF) camera, other than the above. The imaging unit 13 functions as an imaging means of the information processing device 10.

The measuring unit 14 is a sensor for measuring the distance between the moving body 1 and an object around the moving body. For example, the measuring unit 14 is a depth sensor for acquiring depth data. At this time, the measuring unit 14 may be Light Detection and Ranging, Laser Imaging Detection and Ranging (LiDAR) which reads the three-dimensional structure of the surrounding environment of the moving body 1. The LiDAR detects the distance to surrounding objects and the relative velocity by irradiating a surrounding object with a laser beam such as an infrared laser and measuring the time taken for the laser beam to reflect and return. Of course, the measuring unit 14 is not necessarily the LiDAR. For example, the measuring unit 14 may be a ranging system using a millimeter wave radar. The imaging unit 13 functions as an imaging means of the information processing device 10.

The receiving unit 15 is a device for receiving signals used in satellite positioning systems such as a global positioning system (GPS) from satellites. The receiving unit 15 functions as an input means of the information processing device 10.

The input unit 16 is a user interface for the user to input information to the information processing device 10. For example, the input unit 16 is an input device such as a keyboard, a mouse, operation keys, and a touch panel. The input unit 16 functions as an input means of the information processing device 10.

The output unit 17 is a user interface for outputting information to the user. The output unit 17 may be an audio device such as a speaker or a buzzer, or may be a lighting device such as a light emitting diode (LED) lamp. Further, the output unit 17 includes a display unit 17a. The display unit 17a is a display device such as a liquid crystal display or an organic electroluminescence display (Organic EL Display). The output unit 17 functions as an output means of the information processing device 10, and the display unit 17a functions as a display means of the information processing device 10.

The control unit 18 is a controller which controls each unit of the information processing device 10. The control unit 18 may be a controller which controls the moving body 1. For example, the control unit 18 is realized by a processor such as a central processing unit (CPU) or a micro processing unit (MPU). For example, the control unit 18 is realized when the processor executes various programs stored in the storage device inside the information processing device 10 by using random access memory (RAM) or the like as a work area. Incidentally, the control unit 18 may be realized by an integrated circuit such as an application specific integrated circuit (ASIC) and a field programmable gate array (FPGA). Any one of the CPU, MPU, ASIC, and FPGA can be regarded as a controller.

As illustrated in FIG. 4, the control unit 18 includes an acquisition unit 181, a recognition unit 182, a generation unit 183, a tracking unit 184, a calculation unit 185, a setting unit 186, and a movement control unit 187. Each of the blocks (the acquisition unit 181 to the movement control unit 187) configuring the control unit 18 is a functional block indicating the function of the control unit 18. These functional blocks may be software blocks or hardware blocks. For example, each of the above-described functional blocks may be one software module realized by software (including a microprogram) or one circuit block on a semiconductor chip (die). Of course, each functional block may be one processor or one integrated circuit. A method of configuring the functional block is arbitrary. Incidentally, the control unit 18 may be configured in a functional unit different from the above-described functional blocks. The operation of each block (the acquisition unit 181 to the movement control unit 187) configuring the control unit 18 will be described in detail in the description of a map generation process, first to third avoidance processes, and the like described later.

<2-2. Functional Configuration of Information Processing Device>

Figure 5:
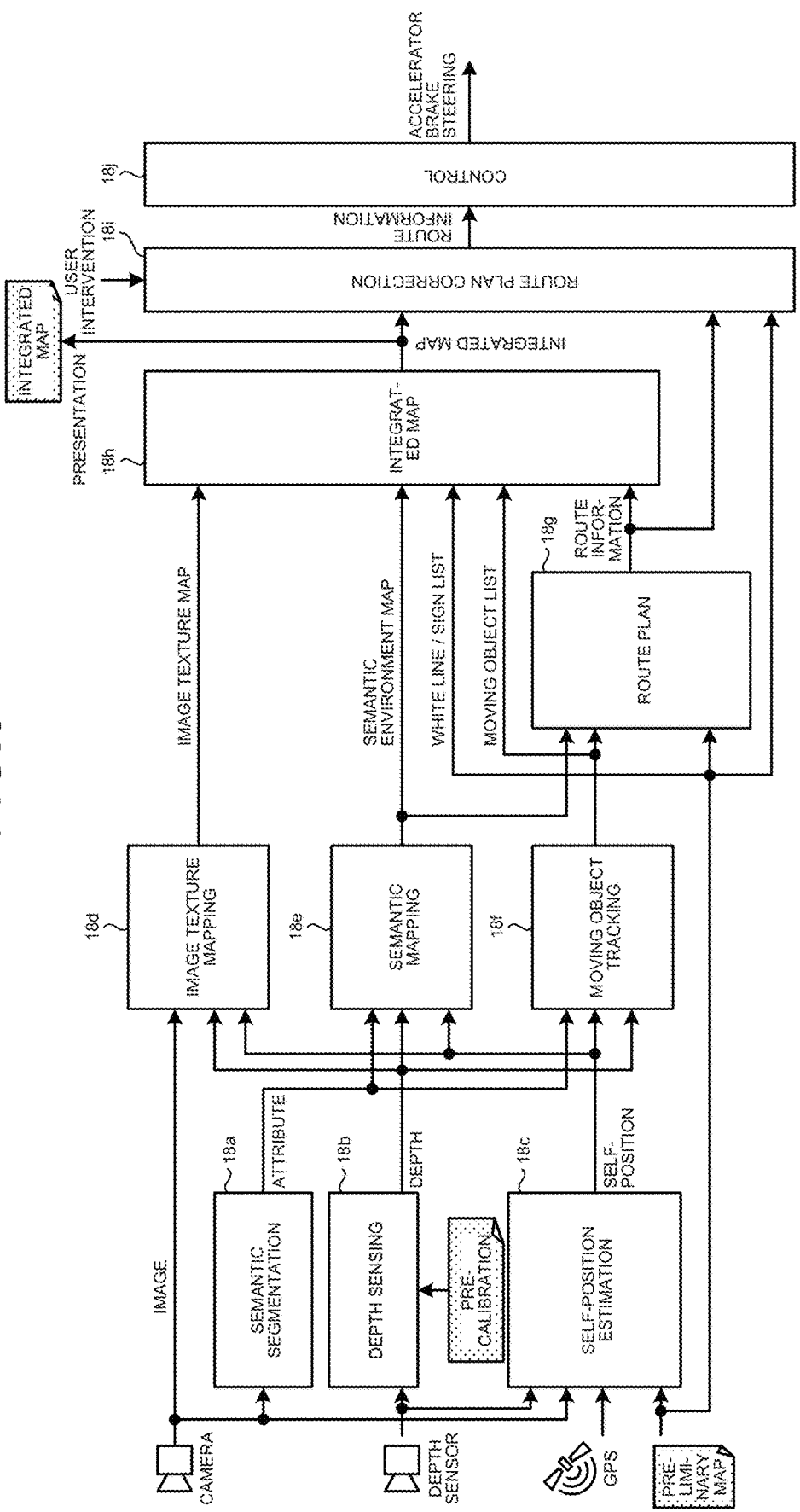
FIG. 5 is a diagram illustrating a functional configuration example of the information processing device according to the embodiment of the present disclosure.

Incidentally, the information processing device 10 can also be expressed as illustrated in FIG. 5. FIG. 5 is a diagram illustrating a functional configuration example of the information processing device 10 according to the embodiment of the present disclosure. The information processing device 10 includes blocks 18a to 18j.

The block 18a is a block which executes semantic segmentation. The block 18a corresponds to the acquisition unit 181 and the recognition unit 182 illustrated in FIG. 4. The block 18a acquires an image captured by a camera. The camera is an example of the imaging unit 13. Then, the block 18a recognizes the attribute of the object (image area) shown in the image captured by the camera by executing the semantic segmentation. The semantic segmentation will be described later.

The block 18b is a block which executes depth sensing. The block 18b corresponds to the acquisition unit 181 illustrated in FIG. 4. The block 18b acquires the measurement result of a depth sensor. The depth sensor is an example of the measuring unit 14 and can measure the distance to an object. Then, the block 18b acquires the depth data on the basis of the measurement result of the depth sensor and the pre-calibration information. The depth data includes distance information (depth value) to the object.

The block 18c is a block which estimates the position (self-position) of the moving body 1. The block 18c corresponds to the acquisition unit 181 illustrated in FIG. 4. The block 18c estimates the self-position on the basis of the image captured by the camera, the measurement result of the depth sensor, and the preliminary map.

The block 18d is a block which executes image texture mapping. The block 18d corresponds to the generation unit 183 illustrated in FIG. 4. The block 18d generates an image texture map on the basis of the image captured by the camera, the depth data acquired by the block 18b, and the self-position estimated by the block 18c.

The block 18e is a block which executes semantic mapping. The block 18e corresponds to the generation unit 183 illustrated in FIG. 4. The block 18e generates a semantic environment map on the basis of the attributes of the object recognized by the block 18a, the depth data acquired by the block 18b, and the self-position estimated by the block 18c.

The block 18f is a block which executes moving object tracking. The block 18f corresponds to the generation unit 183 illustrated in FIG. 4. The block 18f generates a moving object list on the basis of the attributes of the object recognized by the block 18a, the depth data acquired by the block 18b, and the self-position estimated by the block 18c.

The block 18g is a block which executes route plan. The block 18g corresponds to the calculation unit 185 illustrated in FIG. 4. The block 18g generates route information on the basis of the semantic environment map generated by the block 18e, the moving object list generated by the block 18f, and the preliminary map.

The block 18h is a block which generates an integrated map. The block 18g corresponds to the generation unit 183 illustrated in FIG. 4. The block 18h generate an integrated map on the basis of the image texture map generated by the block 18d, the semantic environment map generated by the block 18e, the white line/sign list included in the preliminary map, the route information generated by the block 18g, and the moving object list generated by the block 18f.

The block 18i is a block which modifies a route plan. The block 18i corresponds to the setting unit 186 illustrated in FIG. 4. In a case where there is an intervention of the user in the route of the moving body 1, the block 18i modifies the route information generated by the block 18g on the basis of the instruction of the user.

The block 18j is a block which executes the control of the moving body 1. The block 18j corresponds to the movement control unit 187 illustrated in FIG. 4. The block 18j executes the control of the moving body 1 on the basis of the route information modified by the block 18i.

<2-3. Map Generation Process>

Figure 6:
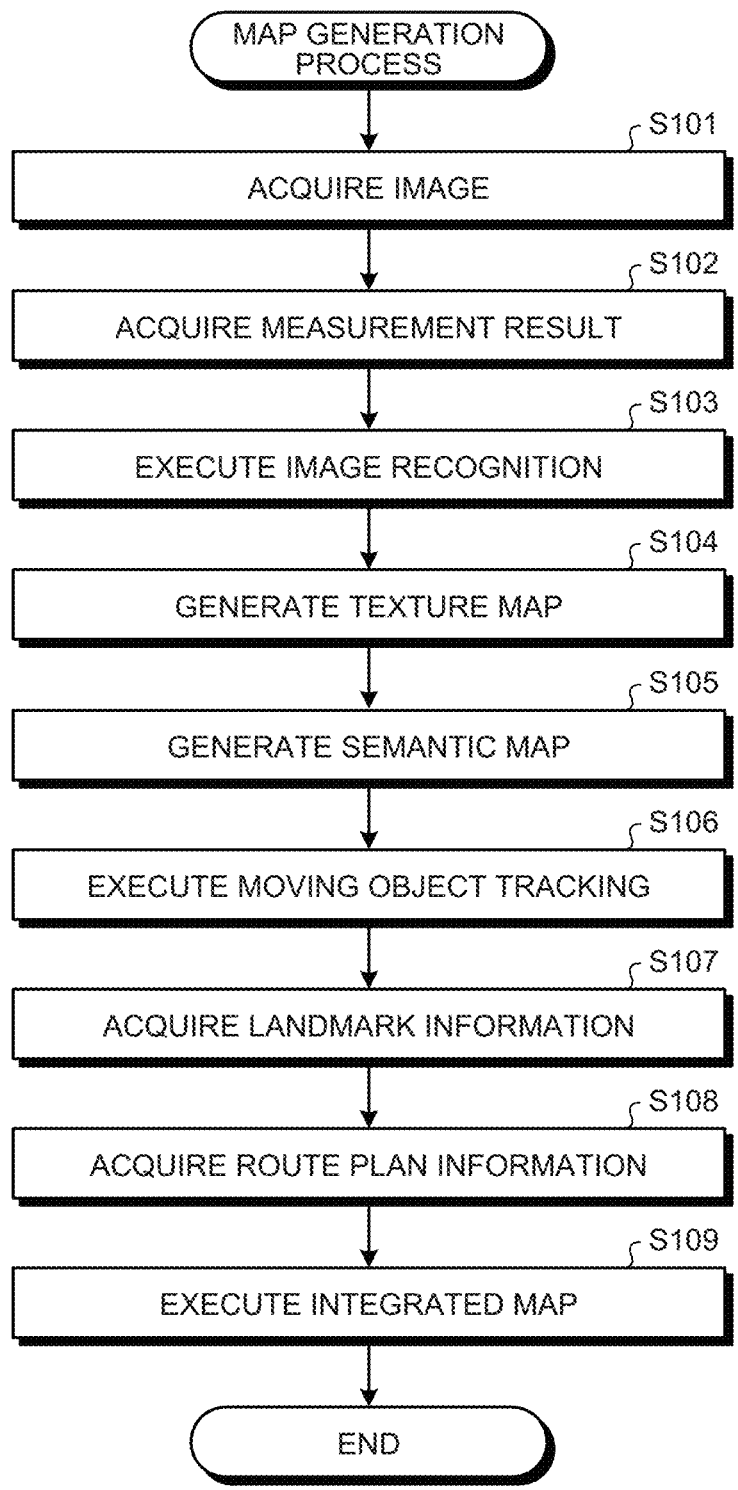
FIG. 6 is a flowchart illustrating a map generation process according to the embodiment of the present disclosure.

Next, the map generation process executed by the information processing device 10 will be described. The map generation process is a process for generating an integrated map. FIG. 6 is a flowchart illustrating a map generation process according to the embodiment of the present disclosure. The control unit 18 of the information processing device 10 executes the map generation process at a predetermined timing. For example, the predetermined timing is a timing at which a certain period of time has elapsed from the previous process. Of course, the predetermined timing may be a timing at which the user executes a predetermined operation (for example, an operation of switching the image displayed on the display unit 17a).

Figure 7:
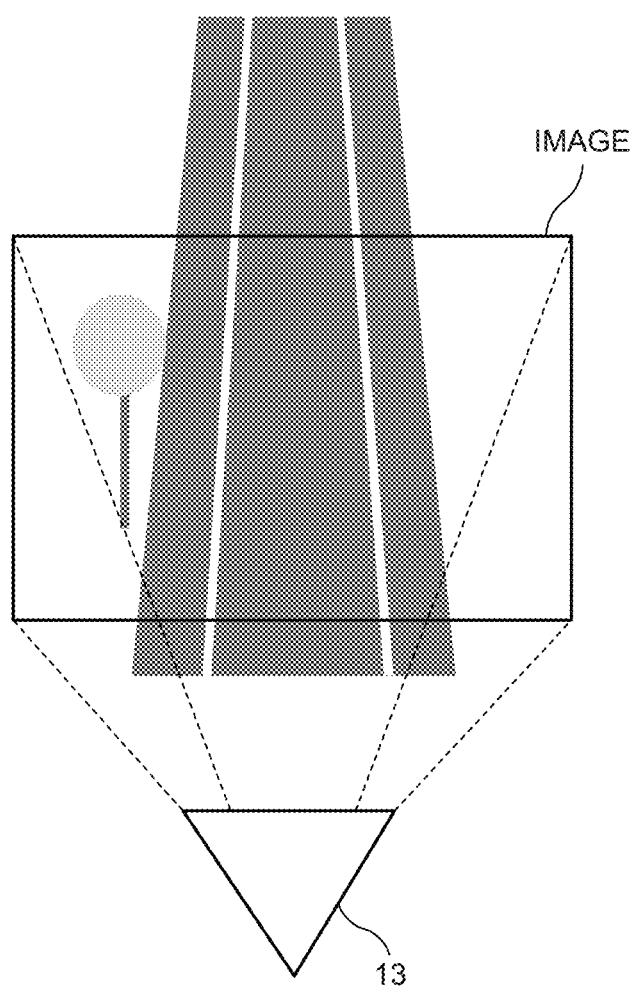
FIG. 7 is a diagram illustrating an aspect in which an imaging unit captures an image of a moving body in a traveling direction.

First, the acquisition unit 181 acquires the image captured by the imaging unit 13 (Step S101). FIG. 7 is a diagram illustrating an aspect in which the imaging unit 13 captures the image of the moving body 1 in a traveling direction. The image captured by the imaging unit 13 is an image captured from the moving body 1, and thus the image is an image from a low position. Therefore, it is difficult for the user to grasp the positional relationship between the moving body 1 and the object in the image only by viewing the image.

Figure 8:
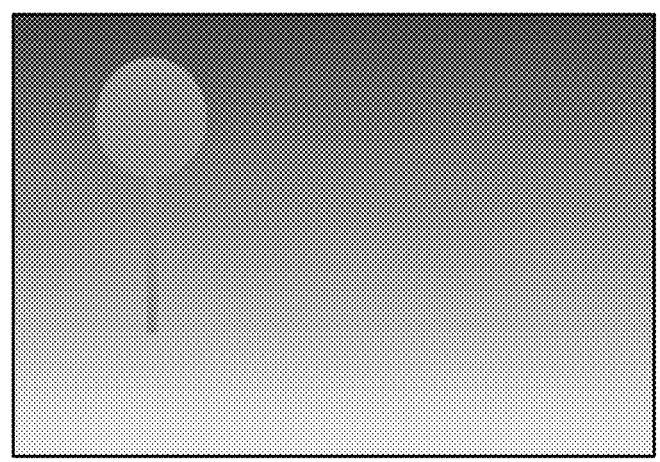
FIG. 8 is a diagram in which depth data acquired by a depth sensor is converted into an image.

Next, the acquisition unit 181 acquires the measurement result of the measuring unit 14 (Step S102). For example, the measuring unit 14 is a depth sensor. When the measuring unit 14 is a depth sensor, the acquisition unit 181 acquires depth data as a measurement result. In FIG. 8, the depth data acquired by the depth sensor is converted into an image. With the depth data, the information processing device 10 can grasp the distance to the object shown in the image captured by the imaging unit 13 in the image.

Next, the recognition unit 182 executes the image recognition of the image captured by the imaging unit 13 (Step S103). For example, the recognition unit 182 recognizes the attribute of the object (image area) shown in the image by executing the semantic segmentation on the image captured by the imaging unit 13. A learning model is used for the semantic segmentation. For example, the learning model is a neural network learned in advance by using teacher data. At this time, the learning model may be a neural network using deep learning such as CNN. Examples of the output label of the learning model include road surfaces, sidewalks, vegetation, stationary structures (buildings, walls, fences, guardrails, and the like), vehicles (automobiles, trucks, buses, and the like), a two-wheel vehicles (motorcycles, bicycles, and the like), person, traffic lights, signs, white lines, the sky, and the like. The output label of the learning model becomes the attribute of the object (image area) shown in the image.

Figure 9:
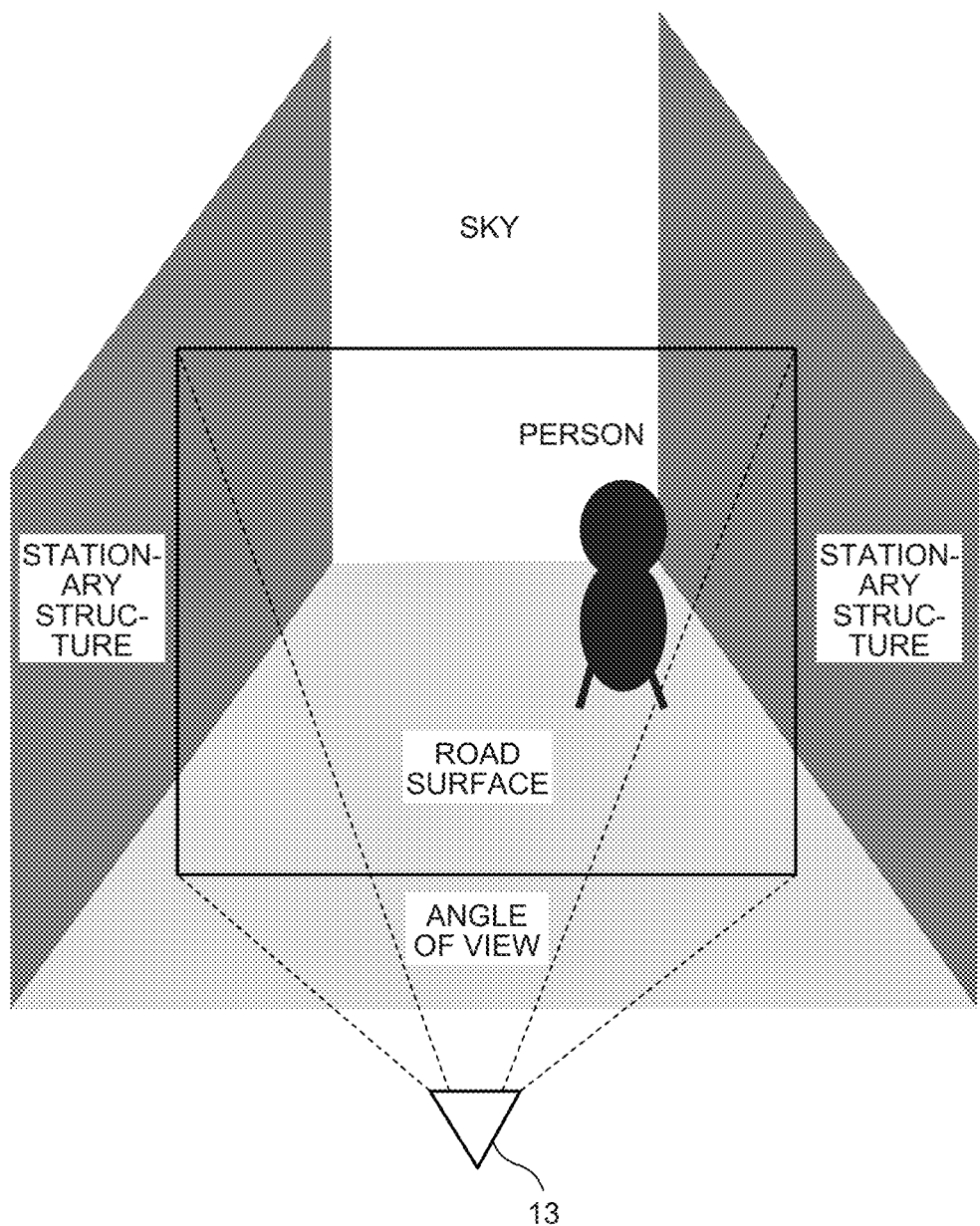
FIG. 9 is a diagram for describing semantic segmentation.

FIGS. 9 and 10 are diagrams for describing the semantic segmentation. FIG. 9 is an example of the image acquired by the imaging unit 13. Incidentally, in the example of FIG. 9, for easy understanding, the characters of a road surface, a stationary structure, a person, and the like are attached to the object shown in the image. However, in reality, these characters are not attached to the image. The image acquired by the imaging unit 13 may be a color image, a monochrome image, or an infrared image. The recognition unit 182 executes semantic segmentation on the image acquired by the imaging unit 13. The upper diagram of FIG. 10 is a diagram before the execution of the semantic segmentation, and the lower diagram of FIG. 10 is a diagram after the execution of the semantic segmentation. In the following description, the drawing after the execution of the semantic segmentation is referred to as a semantic label image. In the semantic label image illustrated in FIG. 10, the object (image area) shown in the image is attached with a pattern indicating the attribute of the object (corresponding image area). However, the information attached to the object (image area) may be a color but not a pattern.

Next, the generation unit 183 generates a texture map (first map) on the basis of the image captured by the imaging unit 13 (Step S104). The generation unit 183 generates a texture map by converting the image captured by the imaging unit 13 into a predetermined bird's-eye view. FIG. 11 is a diagram for describing a general bird's-eye view conversion. The uppermost diagram of FIG. 11 is the image captured by the imaging unit 13, and the lowermost diagram of FIG. 11 is a diagram obtained by performing the bird's-eye view conversion on the uppermost diagram. In general bird's-eye view conversion, as illustrated in the middle part of FIG. 11, the entire image is converted such that the road surface is parallel. In this case, the road surface is straightened. However, objects, such as objects on the road surface, other than the road surface are distorted. The general bird's-eye view conversion also has a problem that the road surface also is distorted when the position/posture of the camera with respect to a determined road surface such as a slope changes.

Figure 12:
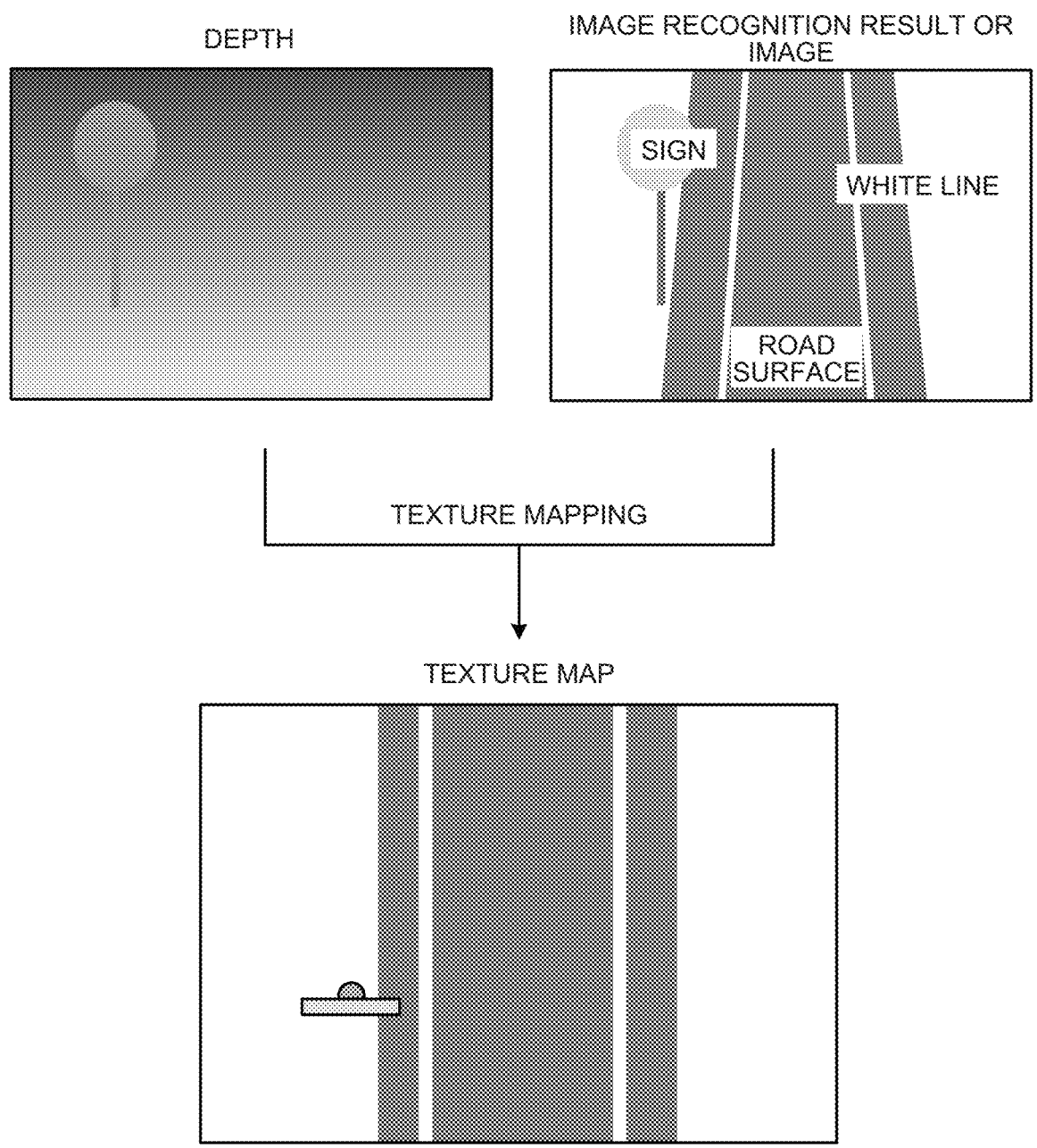
FIG. 12 is a diagram for describing texture mapping.

However, in this embodiment, the generation unit 183 generates a texture map by texture mapping the image captured by the imaging unit 13 using the measurement result (for example, depth data) of the measuring unit 14. FIG. 12 is a diagram for describing texture mapping. In the diagram on the upper left side of FIG. 12, the depth data acquired by the acquisition unit 181 is converted into an image. The diagram on the upper right side of FIG. 12 is a diagram illustrating the image captured by the imaging unit 13 (or the recognition result of the image). In the diagram on the upper right side of FIG. 12, the characters of the sign, the road surface, and the white line which are the attributes of the object are shown. However, these characters need not be displayed. The generation unit 183 generates the texture map shown in the lower part of FIG. 12 by texture mapping the image captured by the imaging unit 13 using the depth data. Specifically, the generation unit 183 generates a texture map by mapping the texture of the image on a plane. In the case of texture map, the road surface is straightened, and the object shape is a three-dimensional object viewed from above. Therefore, the user does not feel unnatural when viewing the map.

Figure 13:
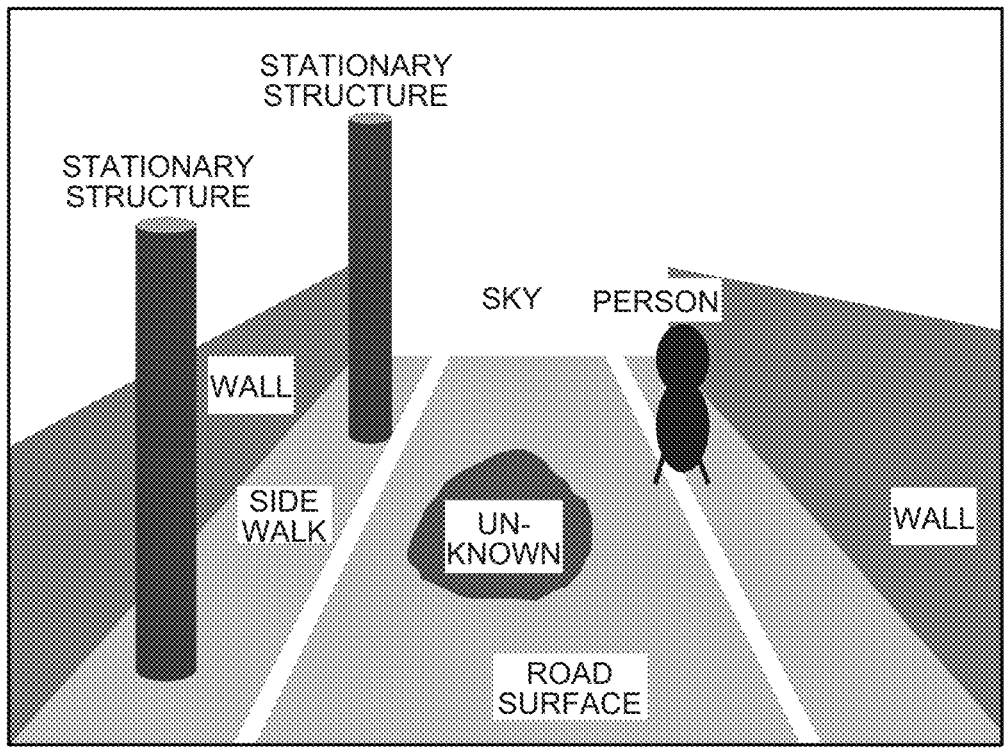
FIG. 13 is a diagram illustrating another example of an image recognition result of the image captured by the imaging unit.
Figure 14:
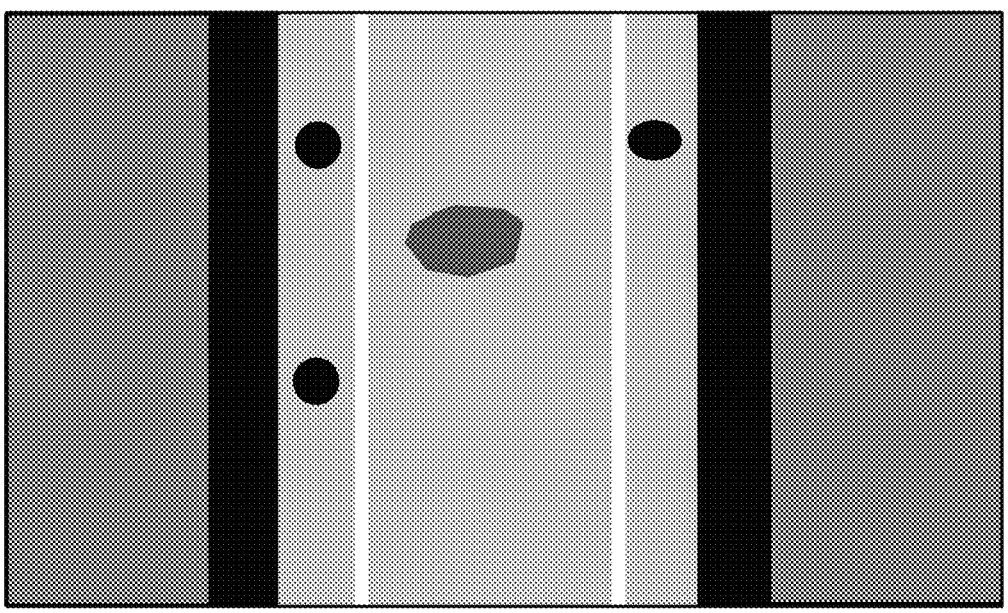
FIG. 14 is a texture map of the image illustrated in FIG. 13.

FIG. 13 is a diagram illustrating another example of the image recognition result of the image captured by the imaging unit 13. In the case of the example of FIG. 13, the characters indicating the attributes of the object are shown in the drawing. However, these characters need not be displayed. In the example of FIG. 13, the dirt area in the image is an area of unknown attribute. Further, FIG. 14 is a texture map of the image illustrated in FIG. 13. When a map is generated by texture mapping, the generated map becomes less distorted.

Figure 15:
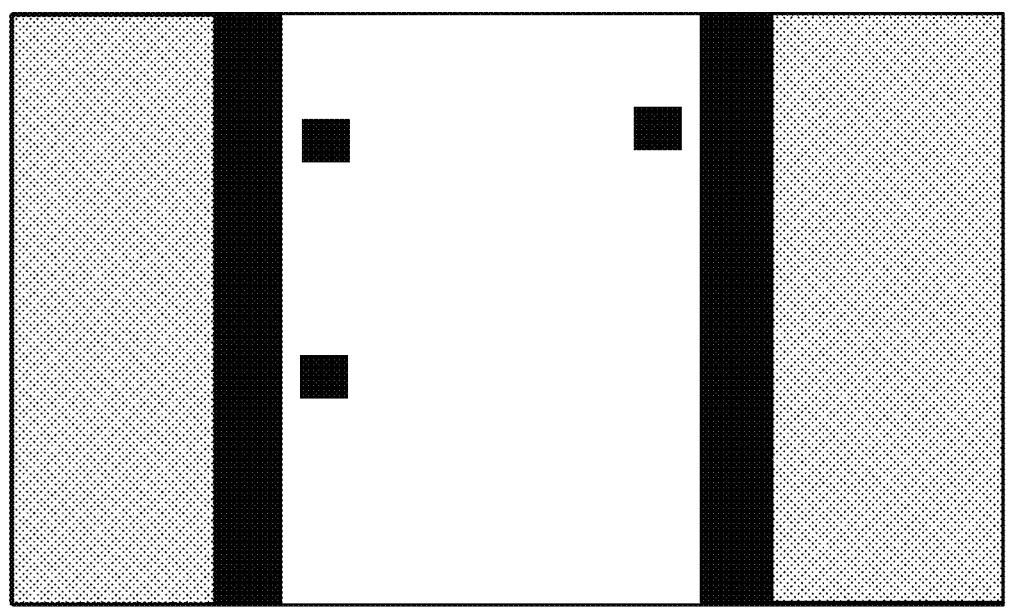
FIG. 15 is an Occupancy Grid Map in a situation illustrated in FIG. 13.
Figure 16:
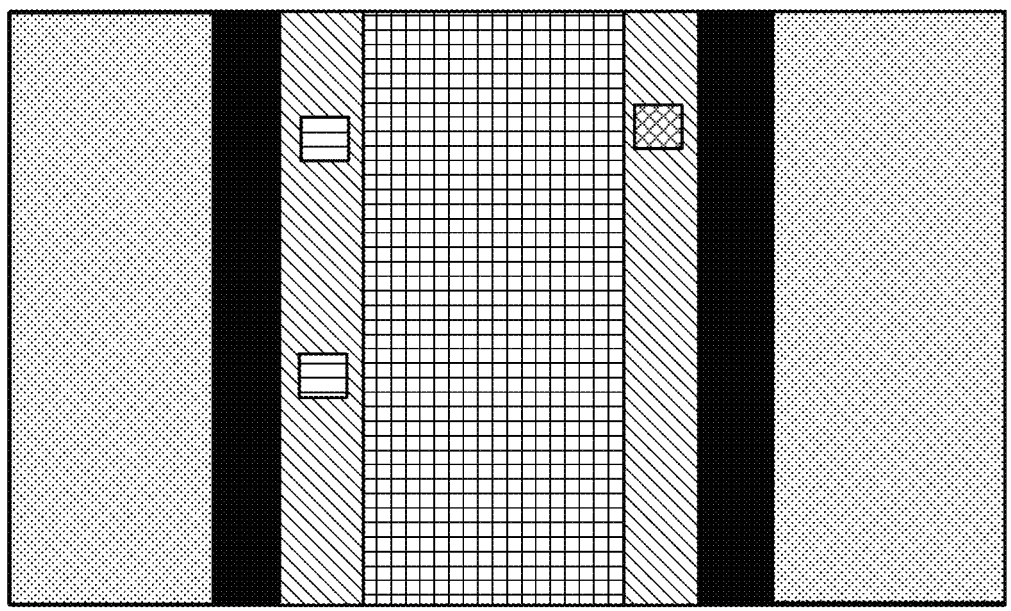
FIG. 16 is a semantic map in the situation illustrated in FIG. 13.

Next, the generation unit 183 generates a semantic map (second map) on the basis of the measurement result of the measuring unit 14 and the recognition result of the recognition unit 182 (Step S105). FIG. 15 is an Occupancy Grid Map in the situation illustrated in FIG. 13. In the example of FIG. 15, black is a place where there is an obstacle, white is a place where there is no obstacle, and gray is a place where the presence or absence of obstacles is unknown. Further, FIG. 16 is a semantic map in the situation illustrated in FIG. 13. The generation unit 183 may generate a semantic map by adding the recognition result (semantics) of the recognition unit 182 to the Occupancy Grid Map on the basis of the measurement result of the measuring unit 14. In the example of FIG. 16, the information indicating the attribute of the image area is a pattern. However, the information indicating the attribute may be a color. For example, the image area of the road surface may be blue, the image area of the sidewalk may be red, and the image area of the telephone pole may be green.

Figure 17:
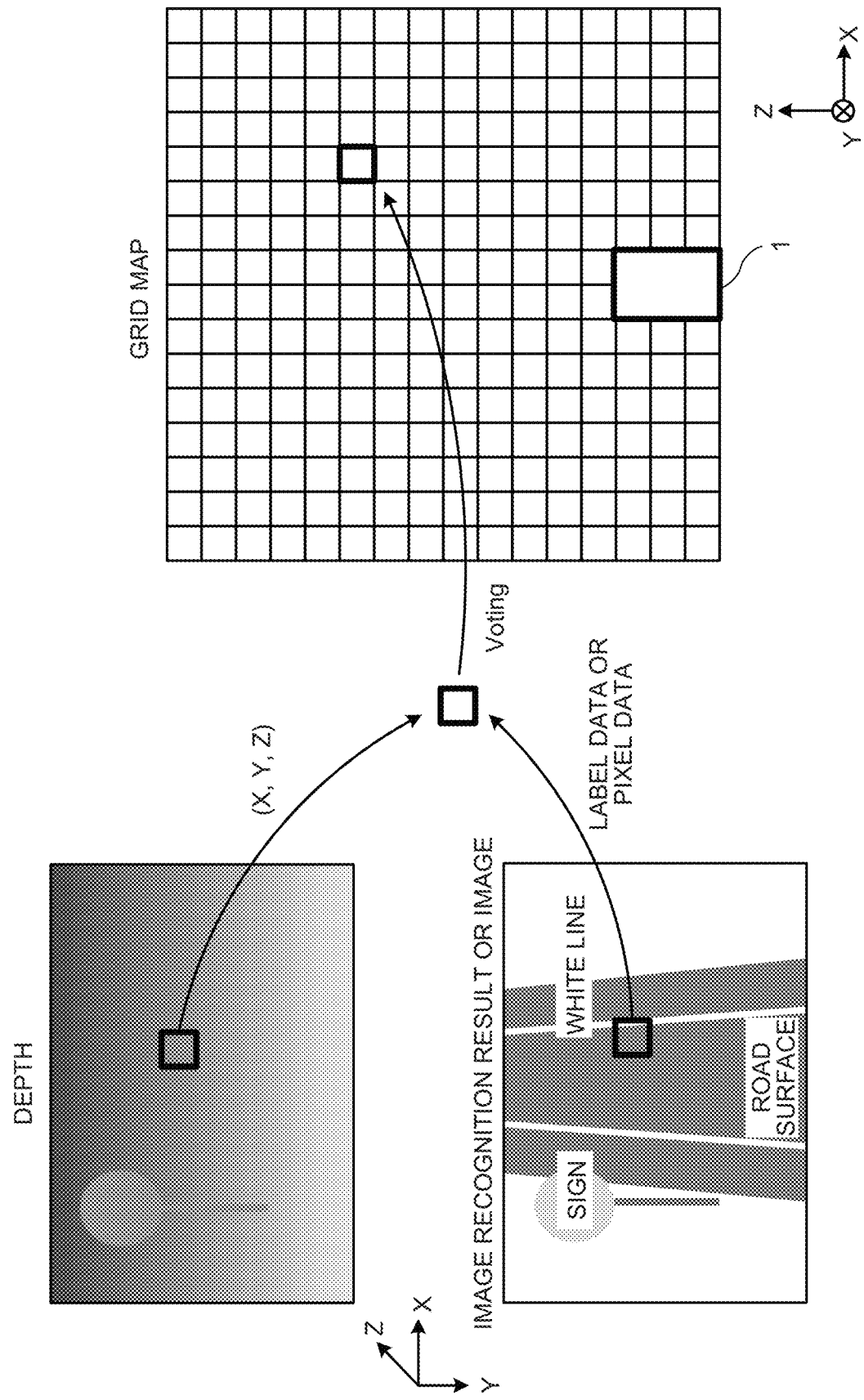
FIG. 17 is a diagram for describing a process of generating the semantic map.

FIG. 17 is a diagram for describing a process of generating the semantic map. As illustrated in FIG. 17, the generation unit 183 generates a semantic map by injecting the label data included in the image recognition result into the grid map on the basis of the depth value ((X, Y, Z) illustrated in FIG. 17) included in the depth data. The label data is data (the output label of the learning model) indicating the attribute of the corresponding image area. When the process is described more specifically, the generation unit 183 specifies the three-dimensional position of a predetermined cell in the image recognition result on the basis of the depth data. The predetermined cell may be a cell having a size equivalent to one pixel or a cell having a size corresponding to a plurality of pixels. Then, the generation unit 183 specifies a position (two-dimensional position) when the predetermined cell is viewed from directly above, and the label data assigned to the predetermined cell is injected to the cell on the grid map corresponding to the position. For example, the generation unit 183 assigns a pattern or color corresponding to the label data to the corresponding cell on the grid map.

Incidentally, the method illustrated in FIG. 17 can also be applied to the generation of the texture map. In this case, the diagram on the lower left side of FIG. 17 may be a simple image but not an image recognition result. Then, the generation unit 183 generates a texture map by injecting the pixels included in the image into the grid map on the basis of the depth value included in the depth data.

Figure 18:
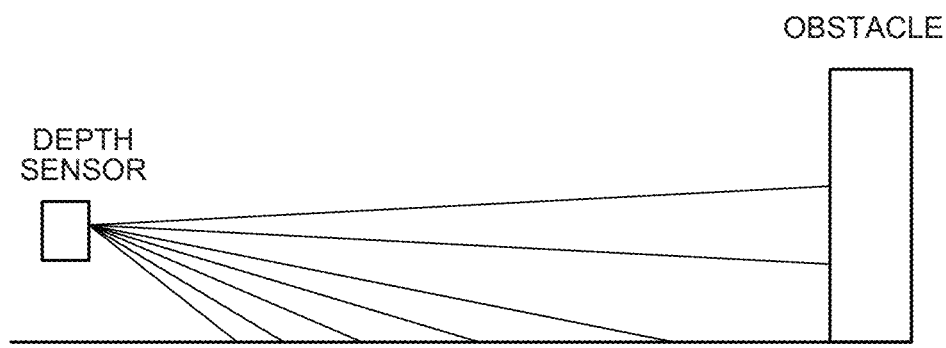
FIG. 18 is a diagram illustrating characteristics of a measurement result of the depth sensor.

In a case where the semantic map is generated by using the depth sensor, it is necessary to pay attention to the characteristics of the depth sensor. FIG. 18 is a diagram illustrating the characteristics of the measurement result of the depth sensor. As illustrated in FIG. 18, the measurement result of the depth sensor becomes sparser when a distance increases. Therefore, in a case where the semantic map is generated using the depth sensor, cells without label data (hereinafter referred to as blank cells) remain in the grid map.

Figure 19:
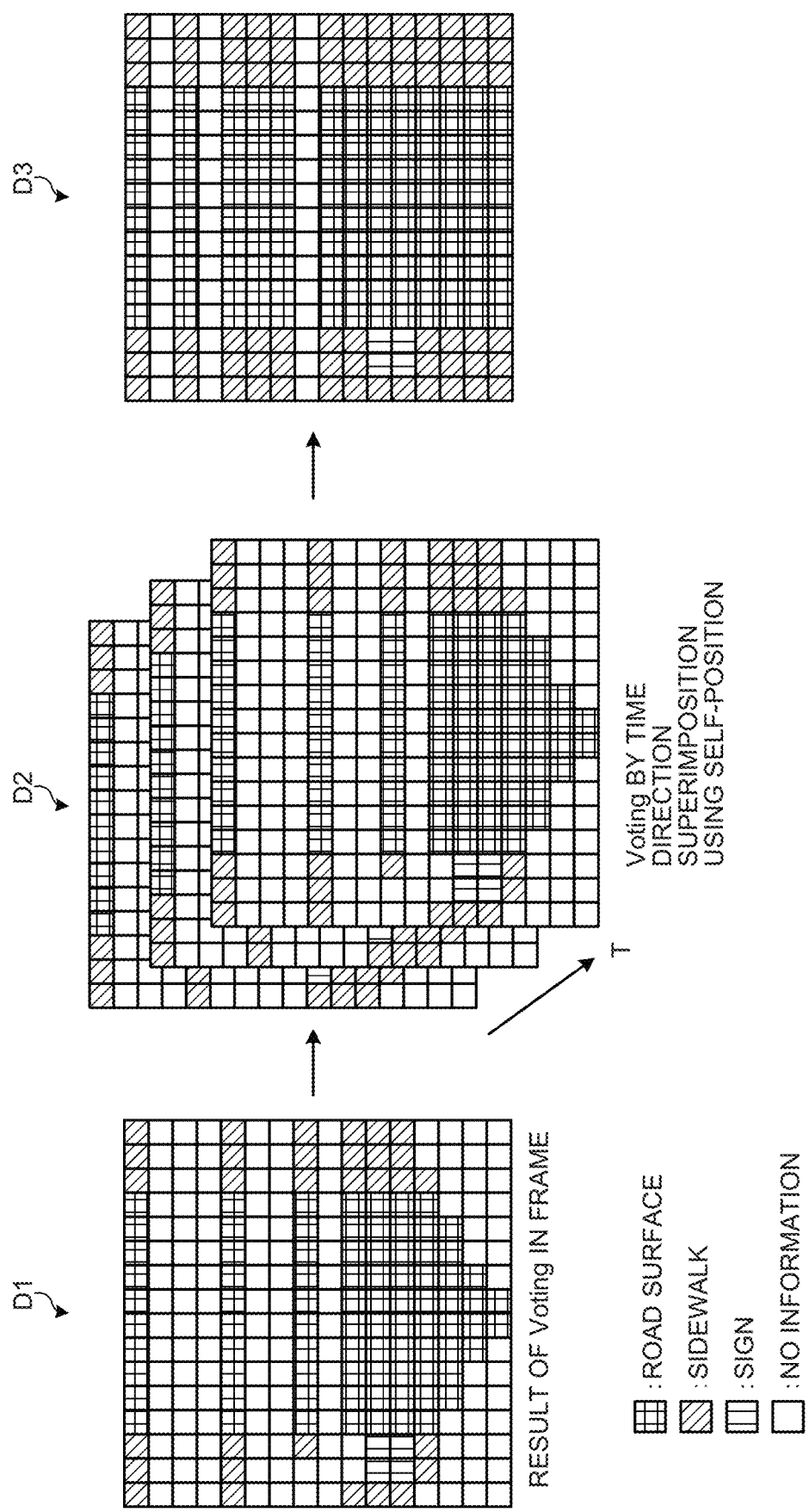
FIG. 19 is a diagram illustrating an example of generating the semantic map using the depth sensor.

FIG. 19 is a diagram illustrating an example of generating the semantic map using the depth sensor. As illustrated in a state D1 of FIG. 19, the generation unit 183 injects label data into a frame (grid map) at a predetermined time. In this case, "no information" cells (blank cells) in which label data is not injected remain in the frame. The generation unit 183 generates such frames at a plurality of different times. Then, the generation unit 183 associates the position information of the moving body 1 with the position of each frame. The position information of the moving body 1 may be calculated on the basis of a signal (for example, a ranging signal from a GPS satellite) received by the receiving unit 15. As illustrated in a state D2 of FIG. 19, the generation unit 183 superimposes frames while shifting little by little on the basis of the position information associated with each frame. For example, when the moving body 1 proceeds straight in the positive direction of the X axis, the frames are superimposed while being shifted in the negative direction of the X axis. A state D3 in FIG. 19 is the result of superimposing the frames.

Figure 20:
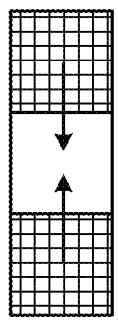
FIG. 20 is a diagram illustrating an aspect of interpolating label data of blank cells.
Figure 21:
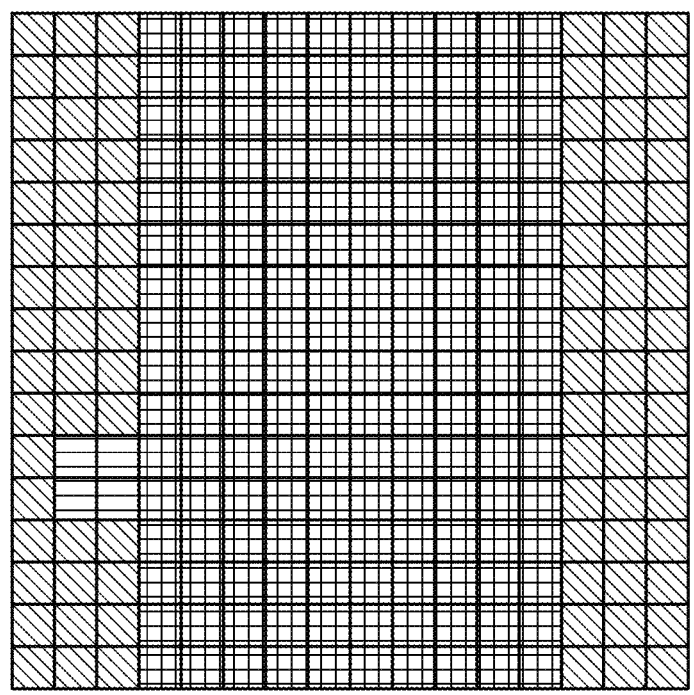
FIG. 21 is a semantic map generated by complementing the blank cells.

Even when a plurality of frames is superimposed, some blank cells remain as illustrated in the state D3 of FIG. 19. In this case, the generation unit 183 complements the label data of the blank cell on the basis of the label data of the cells surrounding the blank cell. For example, as illustrated in FIG. 20, the label data of the blank cell is supplemented by Nearest Neighbor interpolation in a vertical direction. Incidentally, in a case where a plurality of frames is superimposed, a plurality of pieces of label data may be assigned to one cell. In this case, the generation unit 183 may select the most frequent value of the plurality of pieces of label data. Further, in a case where a plurality of pixels is assigned to one cell, the generation unit 183 may use the average value of the plurality of pixels as the pixel value of the cell. FIG. 21 is a semantic map generated by complementing the blank cells.

Figure 22:
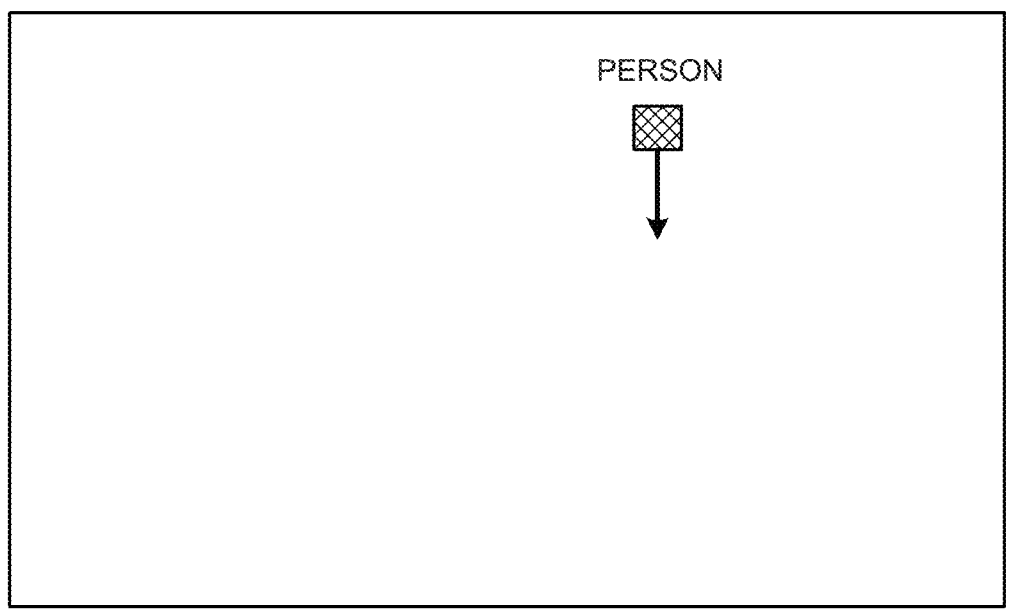
FIG. 22 is a diagram illustrating moving object tracking information on a map.

Next, the tracking unit 184 executes tracking of the moving object shown in the image captured by the imaging unit 13 (Step S106). The tracking unit 184 executes tracking of the moving object on the basis of the image recognition result of the recognition unit 182 and the measurement result of the measuring unit 14. The tracking unit 184 acquires the tracking result of the moving object as moving object tracking information. FIG. 22 illustrates the moving object tracking information on the map. FIG. 22 is the moving object tracking information of the image recognition result illustrated in FIG. 13. In the example illustrated in FIG. 22, the tracking unit 184 recognizes a person as a moving object. The tracking unit 184 acquires the position information of the image area recognized as the moving object, the attribute information ("person" in the example of FIG. 22) of the corresponding moving object, and the information of the moving direction of the corresponding moving object as the moving object tracking information.

Figure 23:
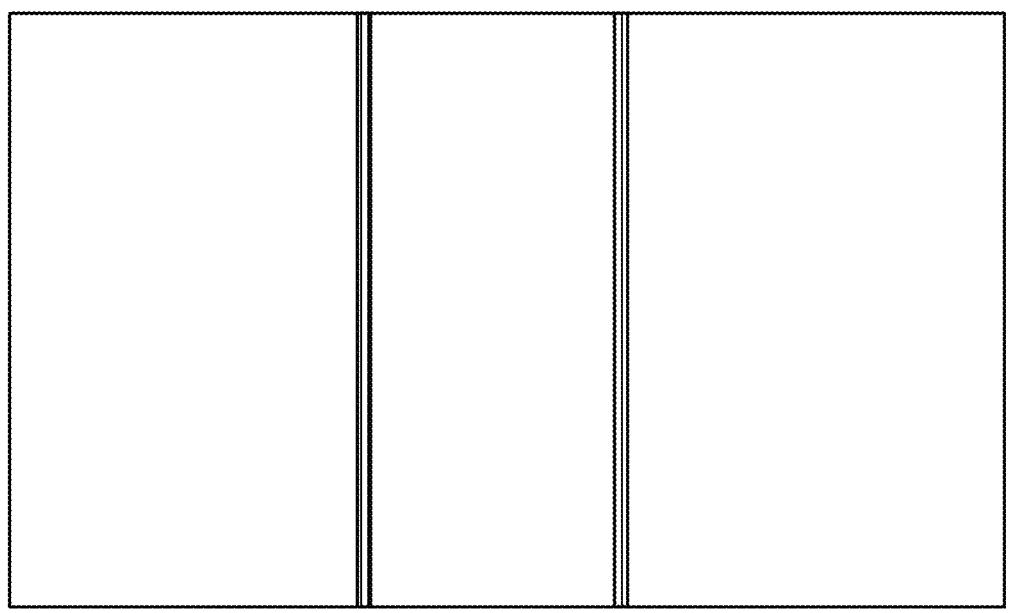
FIG. 23 is a diagram illustrating landmark information on a map.

Next, the acquisition unit 181 acquires the landmark information (Step S107). For example, the acquisition unit 181 acquires the position information of the moving body 1. The position information may be a position estimated on the basis of the signal received by the receiving unit 15. Then, the acquisition unit 181 acquires the information of the landmark at the position of the moving body 1 from the map information stored in the storage unit 12. For example, the acquisition unit 181 acquires information on a signal, a sign, or a white line at the position of the moving body 1. FIG. 23 illustrates the landmark information on the map. In the example of FIG. 23, the acquisition unit 181 acquires the information of the white line as the landmark information.

Figure 24:
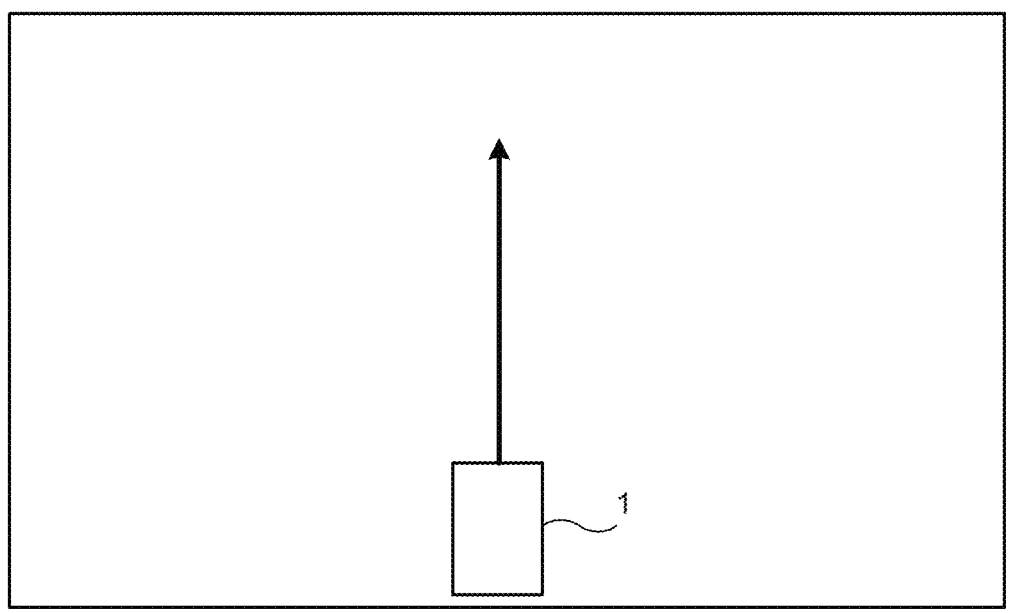
FIG. 24 is a diagram illustrating route information on a map.

Next, the calculation unit 185 generates route information (Step S108). For example, the calculation unit 185 calculates the route plan of the moving body 1 on the basis of the semantic map, the moving object tracking information, and the map information. Then, the calculation unit 185 acquires the calculated route plan as route information. FIG. 24 illustrates the route information on the map. In the example of FIG. 24, the calculation unit 185 acquires the information indicating the current route of the moving body 1 (arrows in the drawing) as the route information.

Figure 25:
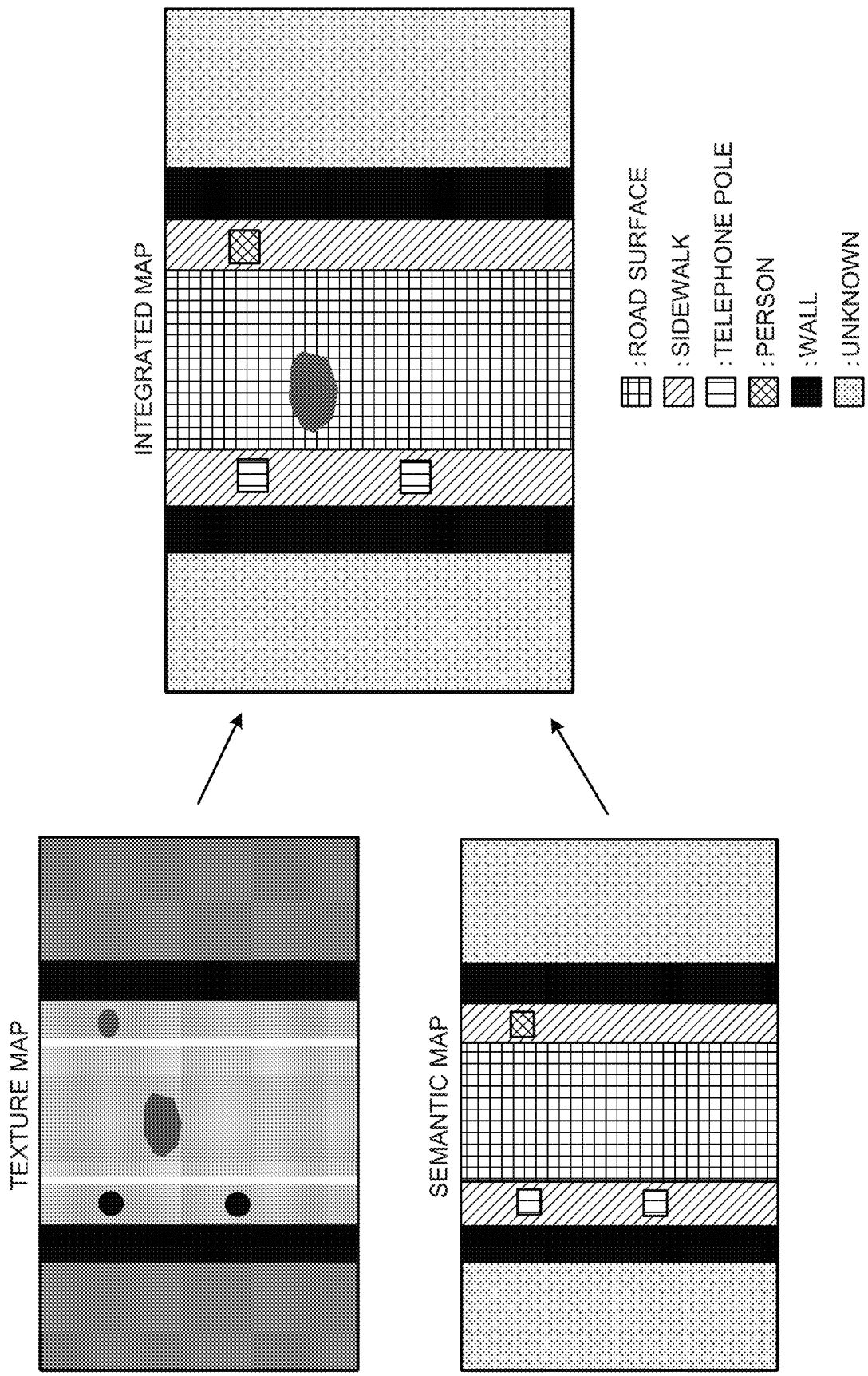
FIG. 25 is an example of an integrated map obtained by integrating the texture map and the semantic map.
Figure 26:
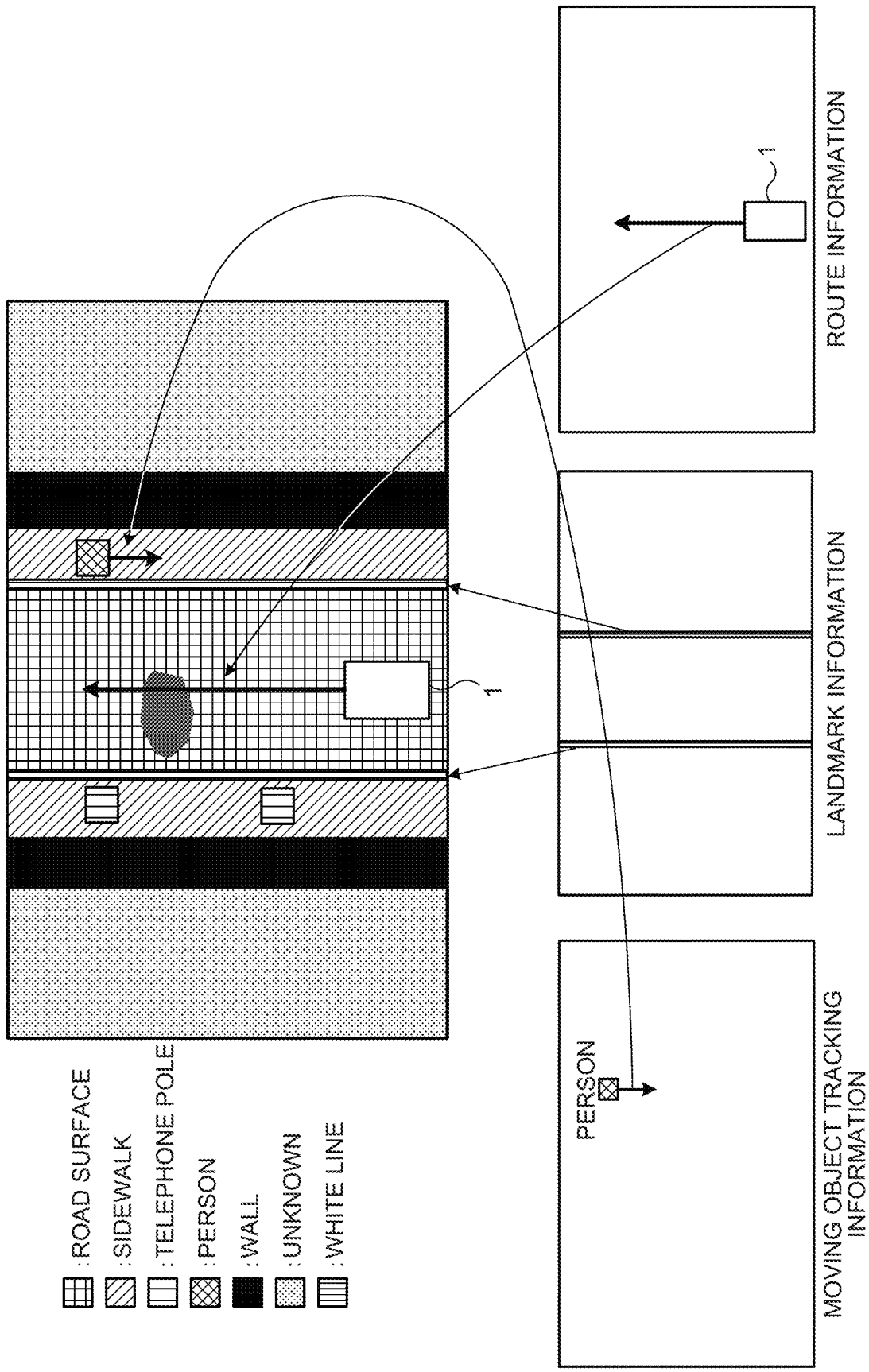
FIG. 26 is an example in which the moving object tracking information, the landmark information, and the route information are displayed on the integrated map illustrated in FIG. 25.

Next, the generation unit 183 generates an integrated map (Step S109). For example, the generation unit 183 generates an integrated map by overlaying the texture map (first map) generated in Step S104 and the semantic map (second map) generated in Step S105. FIG. 25 is an example of the integrated map obtained by integrating the texture map and the semantic map. Incidentally, the generation unit 183 may further display the moving object tracking information acquired in Step S106, the landmark information acquired in Step S107, and the route information acquired in Step S108 on the integrated map such that the user can recognize the information. FIG. 26 is an example in which the moving object tracking information, the landmark information, and the route information are displayed on the integrated map illustrated in FIG. 25.

After the integrated map is generated, the control unit 18 ends the map generation process.

According to this process, the integrated map showing the attributes of the object is generated, and thus the user can easily grasp the situation to instruct the operation of the moving body 1 by using the integrated map.

Further, since the first map used for the integrated map is a texture map, the user can obtain an integrated map with less distortion. Since there is little distortion, it is easier to grasp the situation.

<2-4. Avoidance Process>

Next, the process of avoiding dirt and small falling objects on the road surface will be described. Incidentally, in this embodiment, the "dirt" is assumed to be things which do not hinder autonomous traveling of the moving body 1 but dirty the moving body 1 so that the user cares about. For example, the "dirt" is assumed to be (1) puddles and dirt on the road surface, (2) small falling objects, (3) nylon or the like which does not cause any problem even in a collision, and (4) snow, freezing, fallen leaves, or the like which has a risk of slipping. In the following description, the concept of "dirt" is assumed to include the above (1) to (4).

Figure 27:
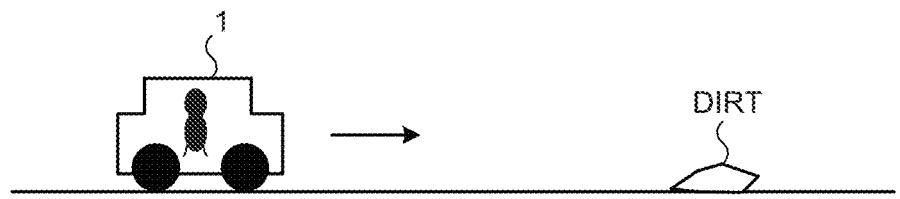
FIG. 27 is a diagram illustrating a first case of an avoidance process.
Figure 28:
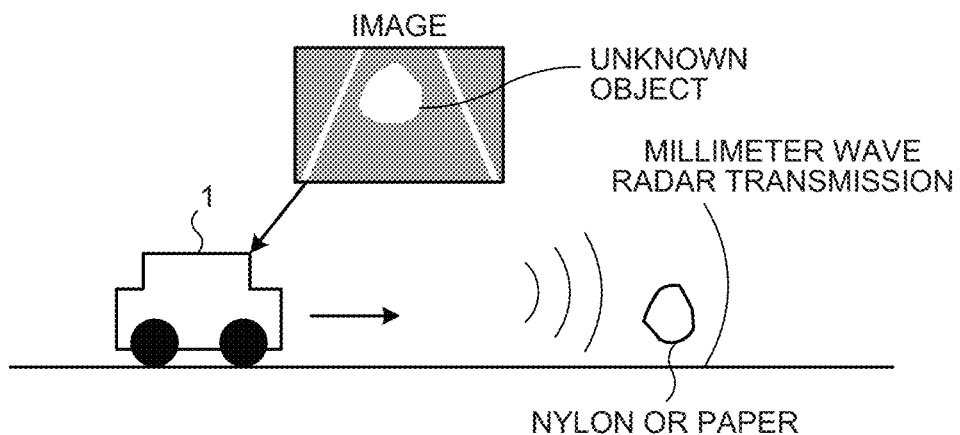
FIG. 28 is a diagram illustrating a second case of the avoidance process.
Figure 29:
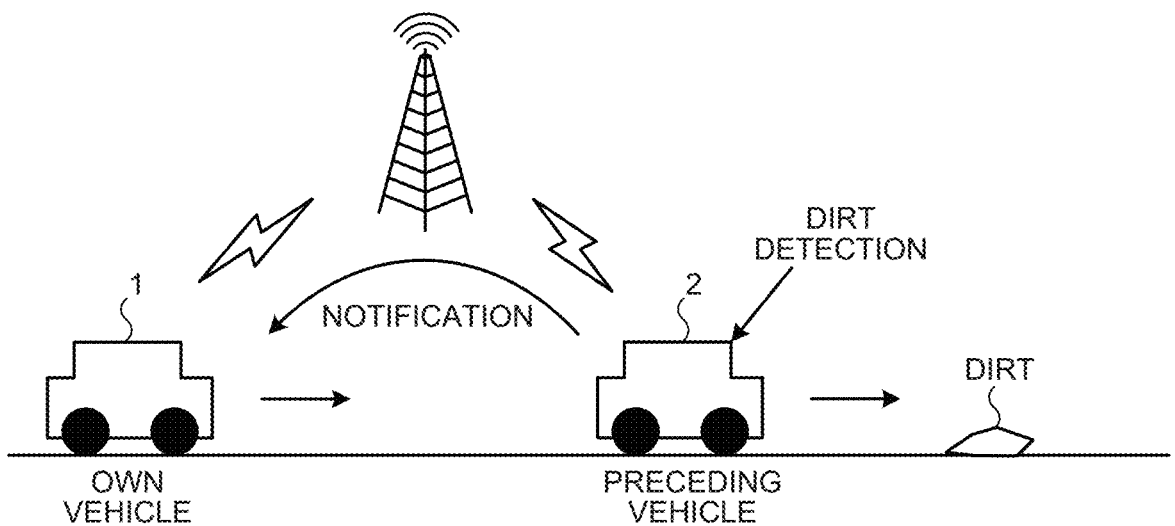
FIG. 29 is a diagram illustrating a third case of the avoidance process.

Various cases can be considered for the avoidance process. In this embodiment, three cases illustrated in FIGS. 27 to 29 are assumed. As illustrated in FIG. 27, a first case is a case where the user discovers dirt on the route, and the user intervenes in the route plan of the moving body 1. As illustrated in FIG. 28, a second case is a case where machine detects an unknown object, and the user decides to change the route plan. As illustrated in FIG. 29, a third case is a case where another moving body (a moving body 2 in the example of FIG. 29) discovers dirt on the route, and information regarding the dirt is notified from the moving body. Each of these three cases will be described below.

(First Avoidance Process)

Figure 30:
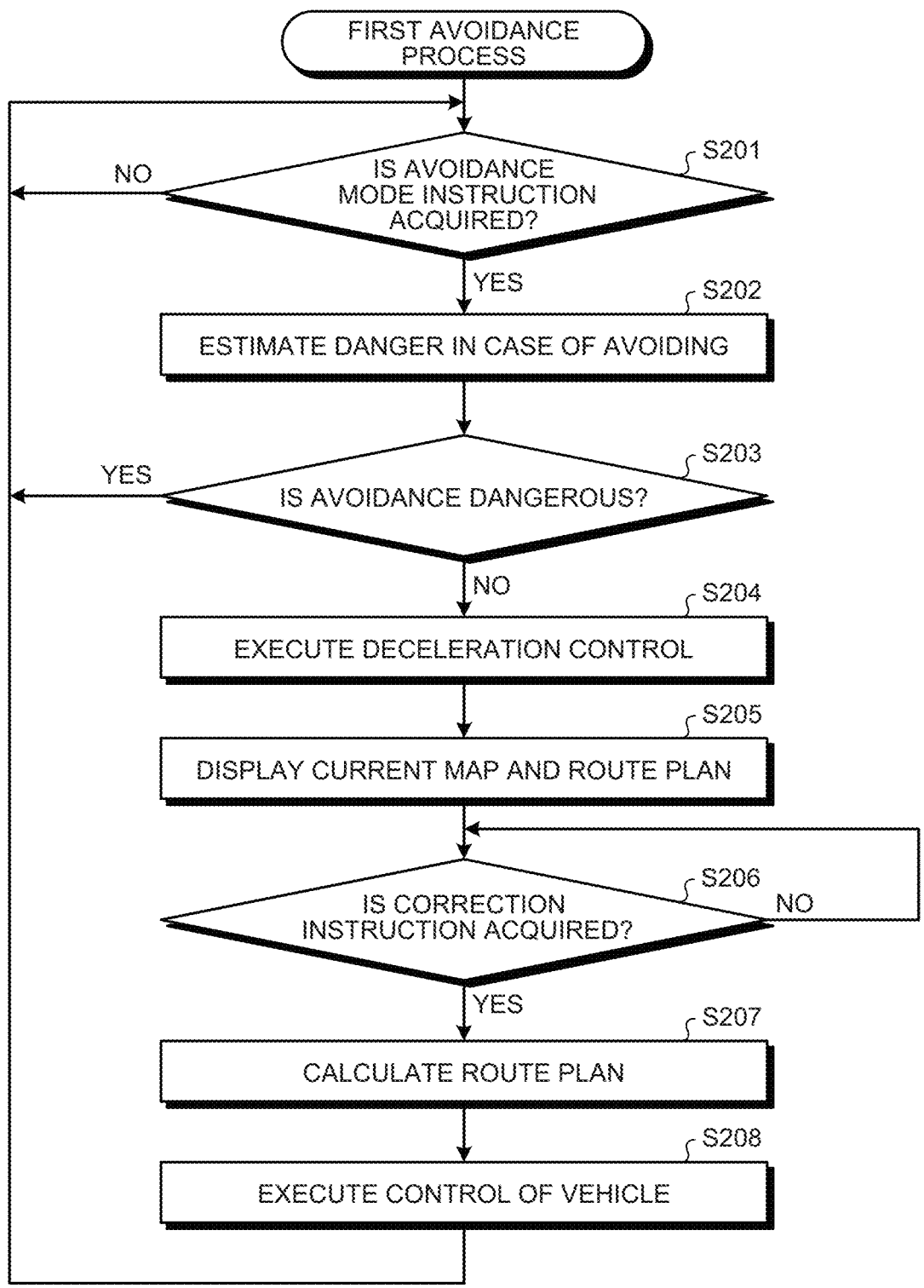
FIG. 30 is a flowchart illustrating a first avoidance process according to the embodiment of the present disclosure.

First, a first avoidance process executed in the first case will be described. The first avoidance process is a process in a case where the user intervenes in the route plan of the moving body 1 by oneself. FIG. 30 is a flowchart illustrating the first avoidance process according to the embodiment of the present disclosure. The control unit 18 of the information processing device 10 executes the first avoidance process when the power of the information processing device 10 is turned on. The information processing device 10 executes the first avoidance process in parallel with the map generation process.

First, the acquisition unit 181 determines whether the avoidance mode instruction is acquired from the user (Step S201). The avoidance mode instruction is an instruction for the user to intervene in the route plan of the moving body 1 and is given via the input unit 16. In a case where the avoidance mode instruction is not acquired (Step S201: No), the acquisition unit 181 repeats Step S201 until the avoidance mode instruction is acquired.

In a case where the avoidance mode instruction is acquired (Step S201: Yes), the calculation unit 185 estimates the danger in the case of traveling while avoiding (Step S202). For example, on the basis of the moving object tracking information acquired in Step S106 of the map generation process, the calculation unit 185 estimates the probability of collision with a moving object in a case where the current route plan is changed. For example, the route plan may be a route plan calculated by the calculation unit 185 in Step S108 of the map generation process.

Then, the setting unit 186 determines on the basis of the estimation result in Step S202 whether avoidance is dangerous (Step S203). For example, the probability of collision with a moving object is calculated in Step S202. In this case, on the basis of whether or not the probability of collision with the moving object is equal to or higher than a predetermined threshold value, the setting unit 186 determines whether the avoidance is dangerous. In a case where the avoidance is dangerous (Step S203: Yes), the control unit 18 returns the process to Step S201 without changing the route plan.

In a case where the avoidance is not dangerous (Step S203: No), the movement control unit 187 executes deceleration control for the moving body 1 (Step S204). Then, the setting unit 186 displays the map of the position where the moving body 1 is currently located and the route plan of the moving body 1 on the display unit 17a (Step S205). For example, the setting unit 186 displays the integrated map generated by the generation unit 183 in Step S109 of the map generation process (for example, the integrated map illustrated in FIG. 26) on the display unit 17a.

Figure 31:
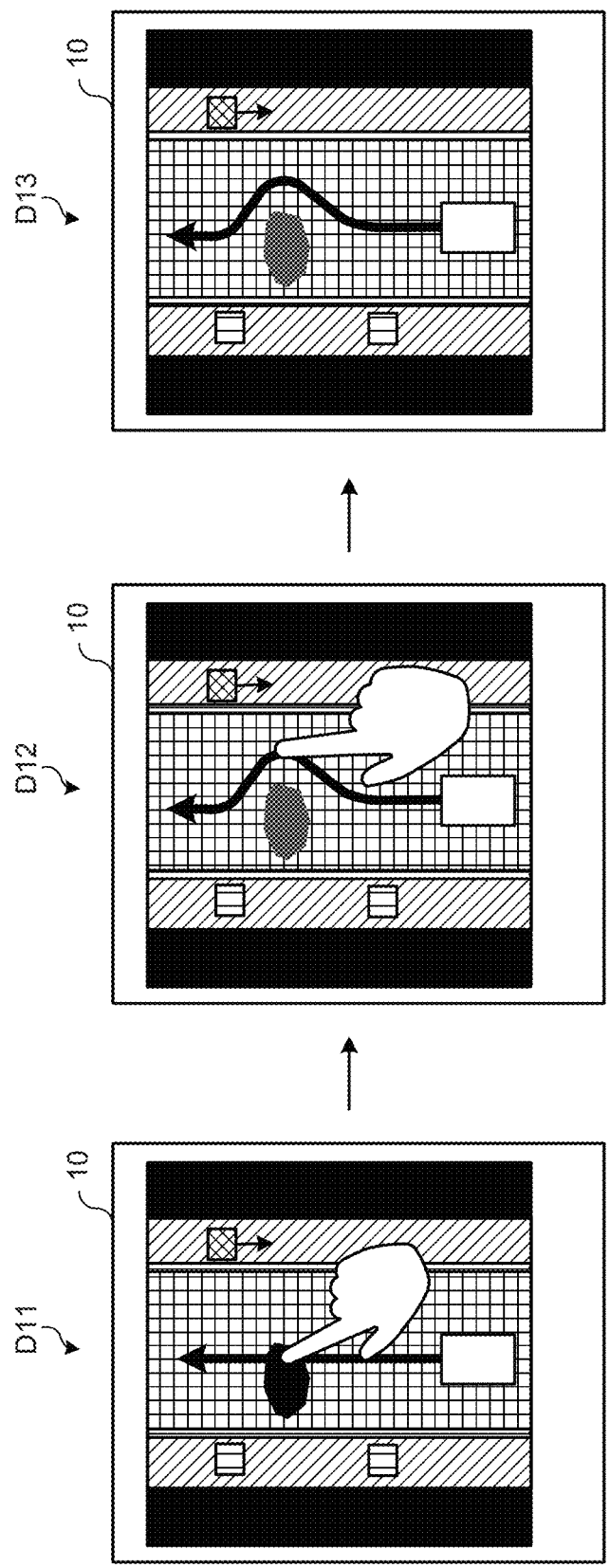
FIG. 31 is a diagram for describing an example of a correction instruction.

Subsequently, the acquisition unit 181 determines whether the correction instruction of the route plan is acquired from the user (Step S206). The correction instruction is an instruction for the user to change the current route of the moving body 1 displayed on the integrated map and is given via the input unit 16. FIG. 31 is a diagram for describing an example of the correction instruction. In a state D11 of FIG. 31, the integrated map showing the current route plan is displayed on the display unit 17a of the information processing device 10. An arrow in the drawing is the current route. The display unit 17a is a touch panel, and the user changes the current route plan by swiping or flicking the arrow indicating the route. The setting unit 186 smoothly complements the arrow and displays the result on the display unit 17a. A state D12 of FIG. 31 is a diagram illustrating an aspect in which the user gives an instruction to correct the route plan. In a case where the correction instruction is not acquired (Step S206: No), the acquisition unit 181 repeats Step S206 until the correction instruction is acquired.

In a case where the correction instruction is not acquired (Step S206: No), the calculation unit 185 calculates the optimum route plan on the basis of the correction instruction of the user while considering the motion constraint or the like of the moving body 1 (Step S207). The optimum route may be calculated by the setting unit 186 instead of the calculation unit 185. The setting unit 186 resets the route of the moving body 1 on the basis of the optimum route plan calculated by the calculation unit 185. A state D13 of FIG. 31 is a diagram illustrating an aspect in which the reset route is displayed.

Figure 32:
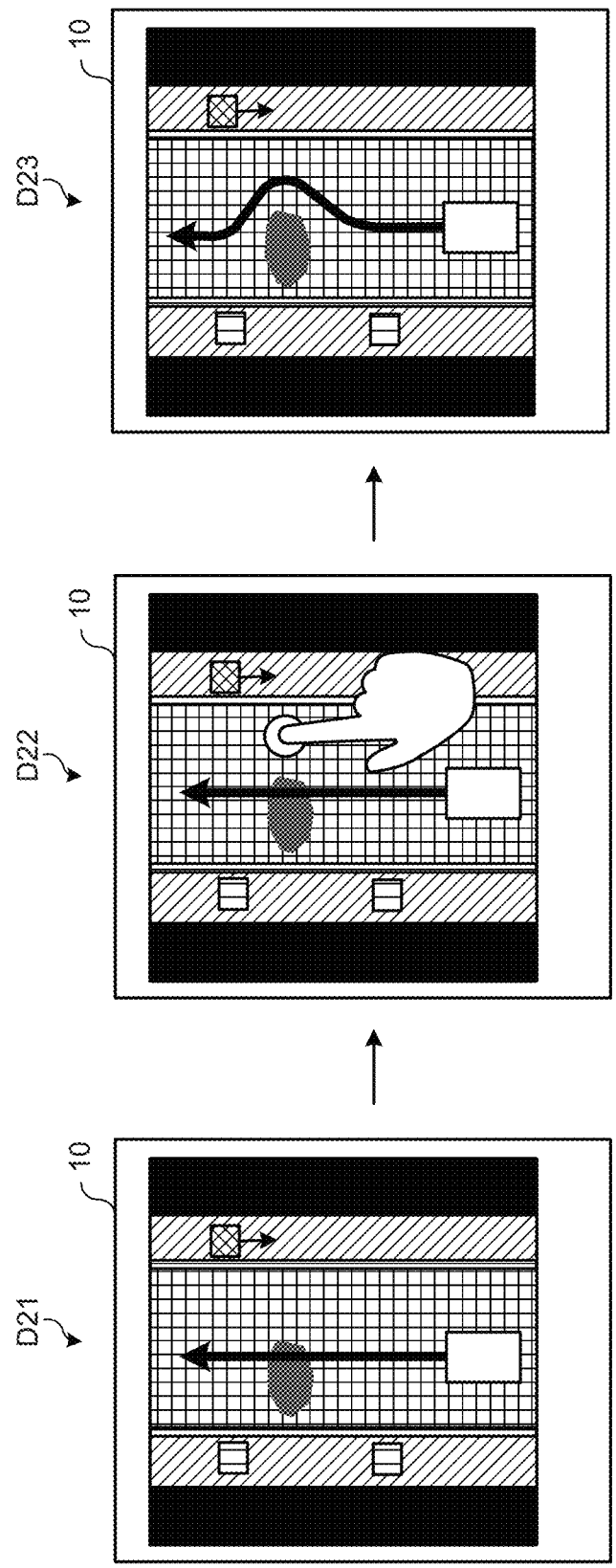
FIG. 32 is a diagram for describing another example of the correction instruction.

Incidentally, the correction instruction of the user is not limited to the example illustrated in FIG. 31. FIG. 32 is a diagram for describing another example of the correction instruction. In a state D21 of FIG. 32, the integrated map showing the current route plan is displayed. In the example of FIG. 32, designates a point (Waypoint) through which the user wants the moving body 1 to pass in the information processing device 10. A state D22 of FIG. 32 is a diagram illustrating an aspect in which the user sets the Waypoint at a position for avoiding the dirt area. As for a method of setting the Waypoint, when the display unit 17a is a touch panel, the user may only touch the corresponding portion. Then, the calculation unit 185 calculates the optimum route plan so as to pass through the Waypoint according to the correction instruction (setting of the Waypoint) of the user in consideration of the motion constraint or the like of the moving body 1. The setting unit 186 resets the route of the moving body 1 on the basis of the optimum route plan calculated by the calculation unit 185. The display unit 17a displays the route set by the setting unit 186. A state D23 of FIG. 32 is a diagram illustrating an aspect in which the reset route is displayed.

Figure 33:
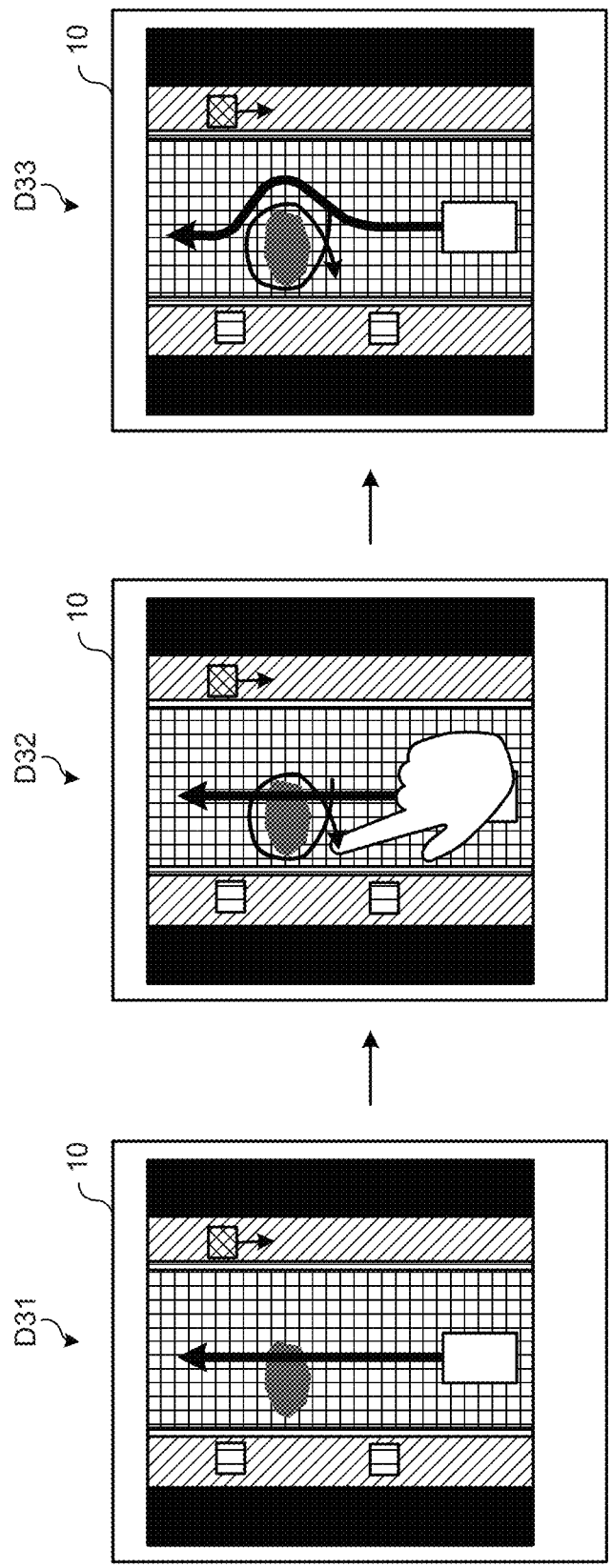
FIG. 33 is a diagram for describing still another example of the correction instruction.

Incidentally, a method of the user giving a correction instruction may be a method other than the method illustrated in FIGS. 31 and 32. FIG. 33 is a diagram for describing another example of the correction instruction. In a state D31 of FIG. 33, the integrated map showing the current route plan is displayed. In the example of FIG. 33, the user designates a predetermined position (avoidance area) desired to be avoided by the moving body 1 in the information processing device 10. The state D32 in FIG. 33 is a diagram illustrating an aspect in which the user sets the avoidance area. As for the method of setting the avoidance area, when the display unit 17a is a touch panel, the user may simply swipe a screen so as to circle the corresponding portion. Then, the calculation unit 185 calculates the optimum route plan so as not to pass through the avoidance area according to the correction instruction (setting of the avoidance area) of the user in consideration of the motion constraint or the like of the moving body 1. The setting unit 186 resets the route of the moving body 1 on the basis of the optimum route plan calculated by the calculation unit 185. A state D33 of FIG. 33 is a diagram illustrating an aspect in which the reset route is displayed.

Figure 34:
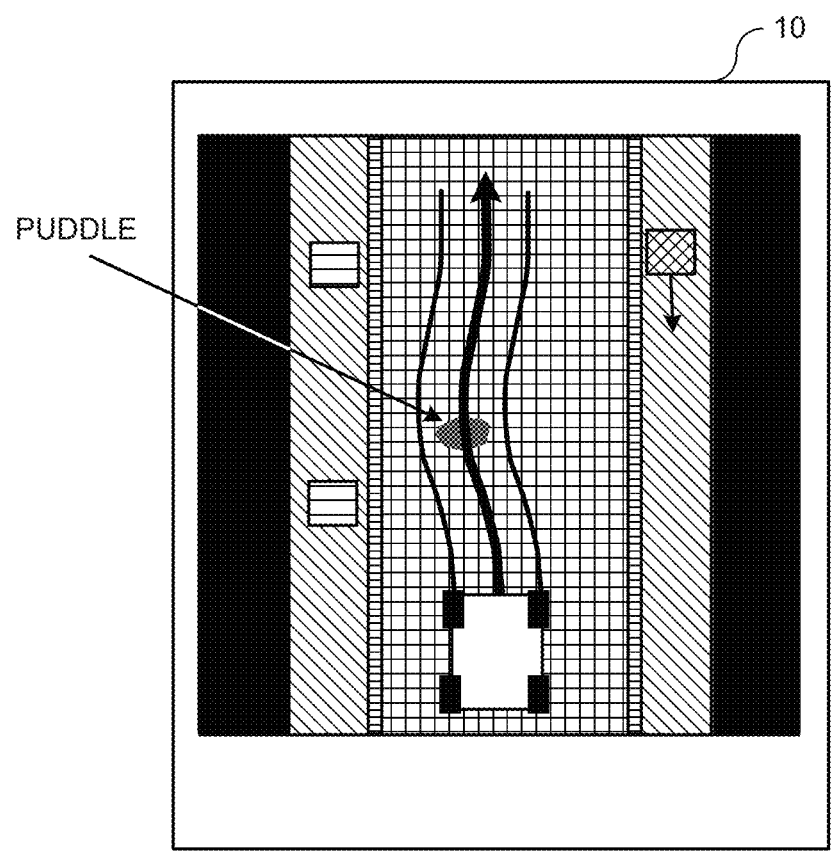
FIG. 34 is a diagram illustrating an aspect in which a reset route is displayed.

Incidentally, the calculation unit 185 may calculate the route plan so as to straddle the dirt area instead of avoiding the dirt area. The setting unit 186 resets the route of the moving body 1 on the basis of the optimum route plan calculated by the calculation unit 185. FIG. 34 is a diagram illustrating an aspect in which the reset route is displayed. In the example of FIG. 34, a puddle is displayed as the dirt area. The calculation unit 185 calculates the route plan such that the moving body 1 proceeds straddling the puddle. The setting unit 186 may display the predicted loci of both wheels of the moving body 1 on the display unit 17a.

Returning to the flow of FIG. 30, the movement control unit 187 controls the moving body 1 according to the route plan calculated in Step S207 (Step S208). Then, the control unit 18 returns the process to Step S201 and waits for the instruction of the user.

With this process, in a case where the user discovers dirt on the route, the route of the moving body can be changed immediately.

(Second Avoidance Process)

Figure 35:
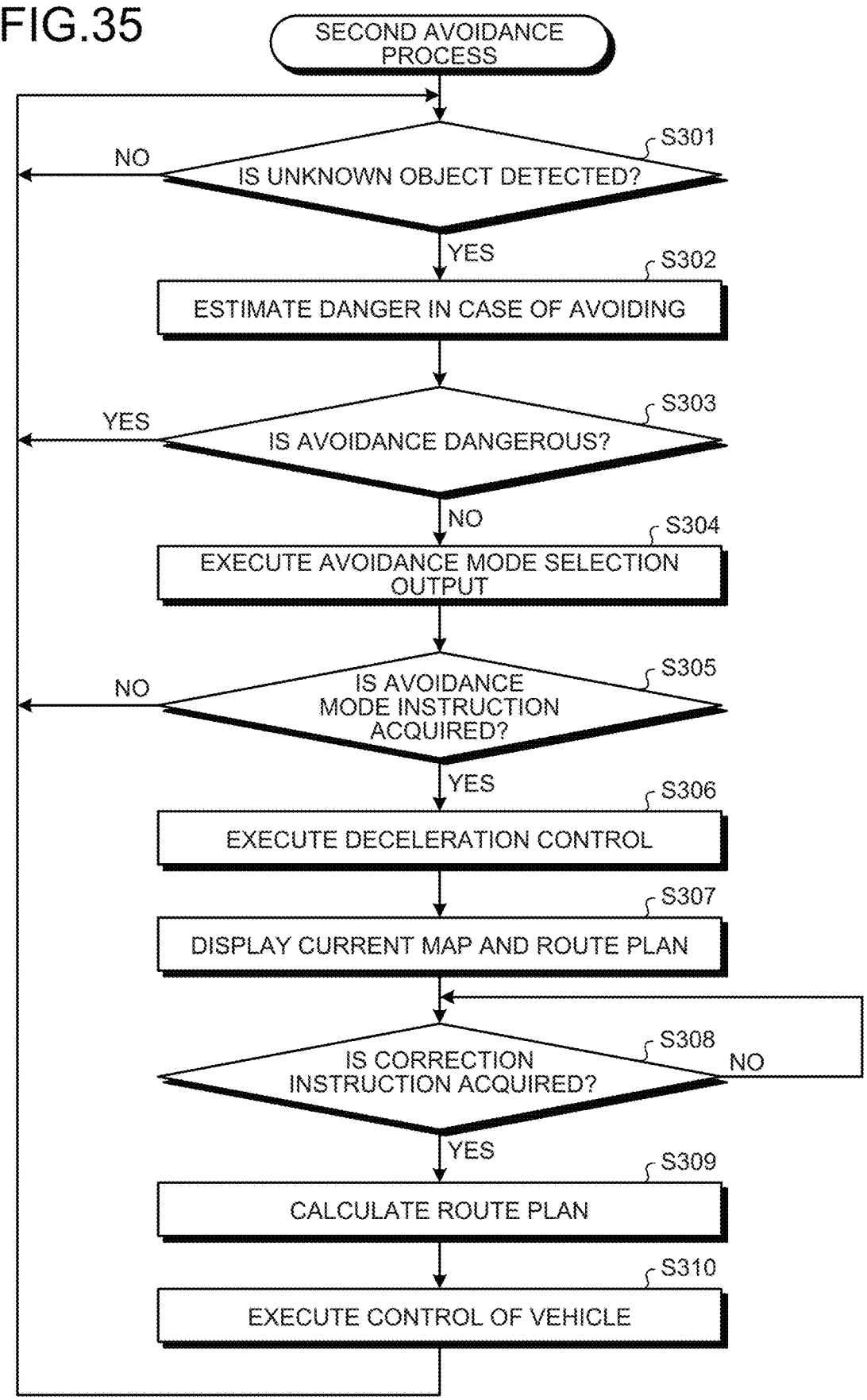
FIG. 35 is a flowchart illustrating a second avoidance process according to the embodiment of the present disclosure.

Next, a second avoidance process executed in the second case will be described. As described with reference to FIG. 28, the second avoidance process is a case where the machine detects an unknown object, and the user decides to change the route plan. FIG. 35 is a flowchart illustrating the second avoidance process according to the embodiment of the present disclosure. The control unit 18 of the information processing device 10 executes the second avoidance process when the power of the information processing device 10 is turned on. The information processing device 10 executes the second avoidance process in parallel with the map generation process.

First, the recognition unit 182 determines whether an unknown object has been detected in a predetermined area (for example, in the road surface area) of the image captured by the imaging unit 13 (Step S301). For example, the recognition unit 182 determines whether or not there is an unknown area in which the attribute cannot be determined in the area where the attribute is the road surface as a result of executing the semantic segmentation. Incidentally, the recognition unit 182 may determine only by image recognition that an unknown area exists. Further, the recognition unit 182 is combined with a different type of sensor such as a millimeter wave radar, and when there occurs a contradiction such as a case where an obstacle cannot be recognized by the millimeter wave radar or the like while an obstacle is recognized on the image, the area where the contradiction occurs may be set as an unknown area. In a case where the unknown object is not detected (Step S301: No), the recognition unit 182 repeats Step S301 until the unknown object is detected.

In a case where an unknown object is detected (Step S301: Yes), the calculation unit 185 estimates the danger in the case of traveling while avoiding the unknown object (Step S302). Then, on the basis of the estimation result in Step S302, the setting unit 186 determines whether avoidance is dangerous (Step S303). In a case where the avoidance is dangerous (Step S303: Yes), the control unit 18 returns the process to Step S301 without changing the route plan.

In a case where the avoidance is not dangerous (Step S303: No), the setting unit 186 executes the avoidance mode selection output to the display unit 17*a* (Step S304). Then, the acquisition unit 181 determines whether the avoidance mode instruction is acquired from the user (Step S305). In a case where the avoidance mode instruction is not acquired even after a certain period of time has elapsed (Step S305: No), the control unit 18 returns the process to Step S301 without changing the route plan.

In a case where the avoidance mode instruction is acquired (Step S305: Yes), the movement control unit 187 executes deceleration control for the moving body 1 (Step S306). Then, the setting unit 186 displays the map of the position where the moving body 1 is currently located and the route plan of the moving body 1 on the display unit 17*a* (Step S307).

Then, the acquisition unit 181 determines whether the correction instruction of the route plan is acquired from the user (Step S308). In a case where the correction instruction is not acquired (Step S308: No), the acquisition unit 181 repeats Step S308 until the correction instruction is acquired. Incidentally, in a case where the instruction is not acquired from the user within the time during which the obstacle can be avoided, the acquisition unit 181 may end the avoidance mode.

In a case where the correction instruction is acquired (Step S308: Yes), the calculation unit 185 calculates the optimum route plan on the basis of the correction instruction of the user while considering the motion constraint or the like of the moving body 1 (Step S309). The optimum route may be calculated by the setting unit 186 instead of the calculation unit 185. The setting unit 186 resets the route of the moving body 1 on the basis of the optimum route plan calculated by the calculation unit 185. The display unit 17*a* displays the route set by the setting unit 186.

Then, the movement control unit 187 controls the moving body 1 according to the route plan calculated in Step S309 (Step S310). Then, the control unit 18 returns the process to Step S301 and waits for the instruction of the user.

With this process, the machine discovers an unknown area on the route and displays the integrated map on the display unit 17*a*. Thus, even in a case where the user delays the discovery of dirt on the route, the route of the moving body can be changed immediately.

(Third Avoidance Process)

Next, a third avoidance process executed in the third case will be described. As explained with reference to FIG. 29, the third avoidance process is a case where another moving body discovers dirt on the route, and information regarding the dirt (hereinafter referred to as dirt information) is notified from the moving body. For example, the dirt information is information indicating the position of dirt. The information processing device 10 receives the dirt information via, for example, a base station. Incidentally, in the following description, the information processing device 10 is assumed to receive the dirt information from the moving body 2. However, the dirt information may be received from a detection device (for example, a dirt detection sensor) installed on the road.

Figure 36:
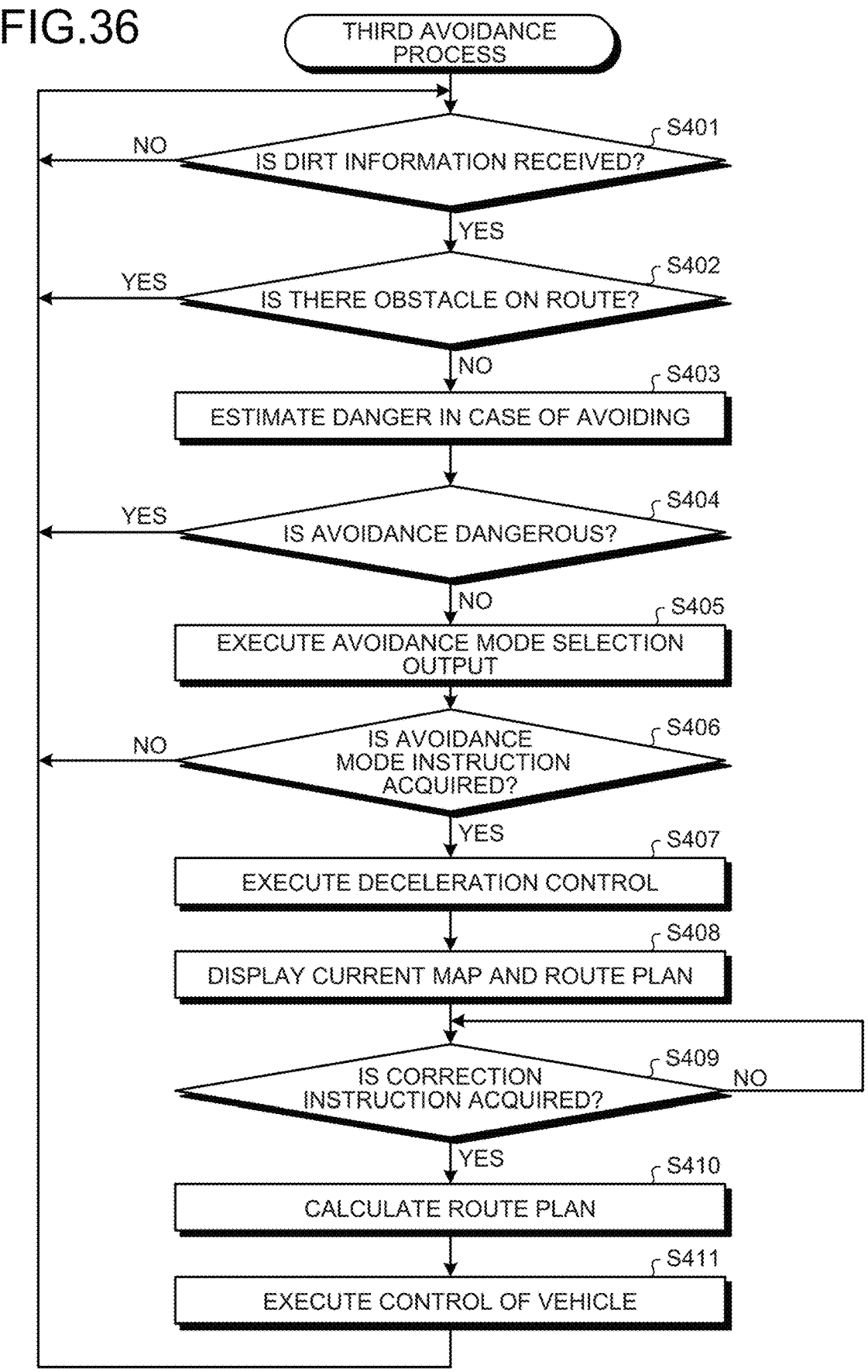
FIG. 36 is a flowchart illustrating a third avoidance process according to the embodiment of the present disclosure.

FIG. 36 is a flowchart illustrating the third avoidance process according to the embodiment of the present disclosure. The control unit 18 of the information processing device 10 executes the third avoidance process when the power of the information processing device 10 is turned on.

The information processing device 10 executes the third avoidance process in parallel with the map generation process.

First, the acquisition unit 181 determines whether the dirt information is received from the moving body 2 (Step S401). In a case where the dirt information is not received (Step S401: No), the acquisition unit 181 repeats Step S401 until the dirt information is received.

In a case where the dirt information is received (Step S401: Yes), the recognition unit 182 determines whether there is an obstacle on the route of the moving body 1 (Step S402). In a case where the machine can correctly recognize an obstacle on the route, the machine does not need to ask the user for decision. In this regard, in a case where there is an obstacle on the route (Step S402: Yes), the control unit 18 returns the process to Step S401.

In a case where any obstacle cannot be recognized on the route (Step S402: No), for example, in a case where the machine cannot recognize any obstacle using the own sensor, the calculation unit 185 estimates the danger in the case of traveling while avoiding the area indicated by the dirt information. (Step S403). Then, on the basis of the estimation result in Step S403, the setting unit 186 determines whether avoidance is dangerous (Step S404). In a case where the avoidance is dangerous (Step S404: Yes), the control unit 18 returns the process to Step S401 without changing the route plan.

In a case where the avoidance is not dangerous (Step S404: No), the setting unit 186 executes the selection output of the avoidance mode to the display unit 17*a* (Step S405). Then, the acquisition unit 181 determines whether the avoidance mode instruction is acquired from the user (Step S406). In a case where the avoidance mode instruction is not acquired even after a certain period of time has elapsed (Step S406: No), the control unit 18 returns the process to Step S401 without changing the route plan.

In a case where the avoidance mode instruction is acquired (Step S406: Yes), the movement control unit 187 executes deceleration control for the moving body 1 (Step S407). Then, the setting unit 186 displays the map of the position where the moving body 1 is currently located and the route plan of the moving body 1 on the display unit 17*a* (Step S408).

Then, the acquisition unit 181 determines whether the correction instruction of the route plan is acquired from the user (Step S409). In a case where the correction instruction is not acquired (Step S409: No), the acquisition unit 181 repeats Step S409 until the correction instruction is acquired. Incidentally, in a case where the instruction is not acquired from the user within the time during which the obstacle can be avoided, the control unit 18 may end the avoidance mode.

In a case where the correction instruction is acquired (Step S409: Yes), the calculation unit 185 calculates the optimum route plan on the basis of the correction instruction of the user while considering the motion constraint or the like of the moving body 1 (Step S410). The optimum route may be calculated by the setting unit 186 instead of the calculation unit 185. The setting unit 186 resets the route of the moving body 1 on the basis of the optimum route plan calculated by the calculation unit 185. The display unit 17*a* displays the route set by the setting unit 186.

Then, the movement control unit 187 controls the moving body 1 according to the route plan calculated in Step S410 (Step S411). Then, the control unit 18 returns the process to Step S401 and waits for the instruction of the user.

With this process, even dirt at a position invisible to the user who drives the moving body 1 can be discovered. Thus, the user can avoid the dirt with a high probability.

3. SECOND EMBODIMENT

Figure 37:
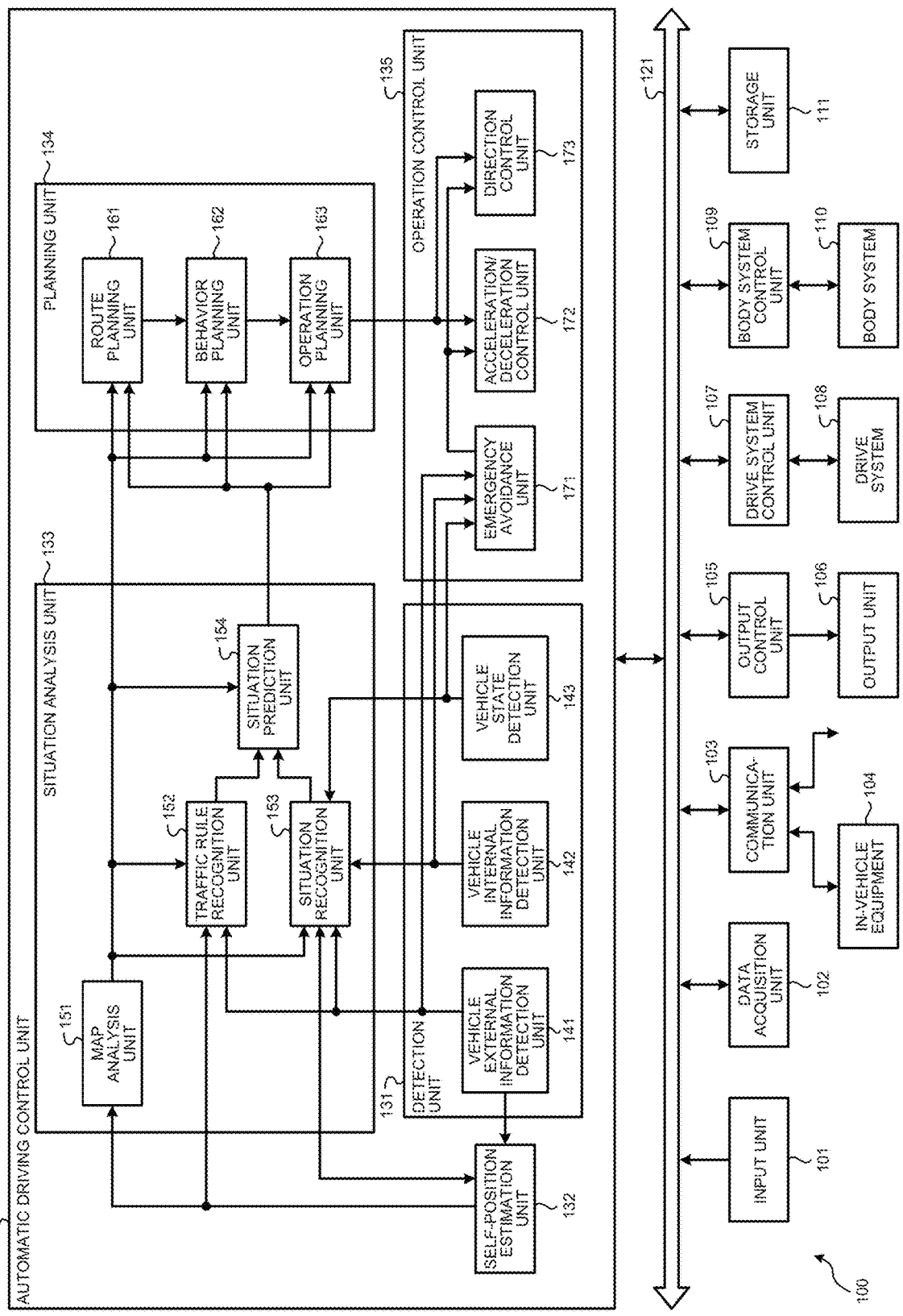
FIG. 37 is a block diagram illustrating a configuration example of a schematic function of a vehicle control system which is an example of a moving-body control system to which the present technology can be applied.

Hereinbefore, the information processing device 10 has been described in the first embodiment. However, the information processing device of the present technology can also be configured as a moving-body control system described below. FIG. 37 is a block diagram illustrating a configuration example of a schematic function of a vehicle control system 100 which is an example of the moving-body control system to which the present technology can be applied.

An automatic driving control unit 112 of the vehicle control system 100 corresponds to the control unit 18 of the information processing device 10 of the first embodiment. For example, a detection unit 131 and a self-position estimation unit 132 of the automatic driving control unit 112 correspond to the acquisition unit 181 of the control unit 18. Further, a situation analysis unit 133 of the automatic driving control unit 112 corresponds to the recognition unit 182 or the tracking unit 184 of the control unit 18. Further, a planning unit 134 of the automatic driving control unit 112 corresponds to the calculation unit 185 or the setting unit 186 of the control unit 18. Further, an operation control unit 135 of the automatic driving control unit 112 corresponds to the movement control unit 187 of the control unit 18. In addition to the block illustrated in FIG. 37, the automatic driving control unit 112 may have a block corresponding to the generation unit 183 of the control unit 18. An output control unit 105 may be regarded as the generation unit 183.

Incidentally, hereinafter, in a case where a vehicle provided with the vehicle control system 100 is distinguished from other vehicles, the vehicle is referred to as the own vehicle.

The vehicle control system 100 includes an input unit 101, a data acquisition unit 102, a communication unit 103, in-vehicle equipment 104, the output control unit 105, an output unit 106, a drive system control unit 107, a drive system 108, a body system control unit 109, and a body system 110, a storage unit 111, and the automatic driving control unit 112. The input unit 101, the data acquisition unit 102, the communication unit 103, the output control unit 105, the drive system control unit 107, the body system control unit 109, the storage unit 111, and the automatic driving control unit 112 are connected to each other via a communication network 121. For example, the communication network 121 is configured by an in-vehicle communication network, a bus compliant, or the like conforming to arbitrary standards such as controller area network (CAN), local interconnect network (LIN), local area network (LAN), and FlexRay (registered trademark). Incidentally, there is a case where the units of the vehicle control system 100 are directly connected without using the communication network 121.

Incidentally, hereinafter, in a case where each unit of the vehicle control system 100 communicates via the communication network 121, the description of the communication network 121 is omitted. For example, in a case where the input unit 101 and the automatic driving control unit 112 communicate with each other via the communication network 121, it is simply described that the input unit 101 and the automatic driving control unit 112 communicate with each other.

The input unit 101 includes a device used by a passenger to input various kinds of data, instructions, and the like. For example, the input unit 101 includes an operation device such as a touch panel, a button, a microphone, a switch, and a lever, and an operation device in which input can be performed by a method other than a manual operation such as voice or gesture. Further, for example, the input unit 101 may be a remote control device which uses infrared rays or other radio waves, or an externally connected device such as a mobile device or a wearable device which corresponds to the operation of the vehicle control system 100. The input unit 101 generates an input signal on the basis of the data, instructions and the like input by the passenger, and supplies the input signal to each unit of the vehicle control system 100.

The data acquisition unit 102 includes various sensors which acquire data used for processing of the vehicle control system 100, and supplies the acquired data to each unit of the vehicle control system 100.

For example, the data acquisition unit 102 includes various sensors for detecting the state of the own vehicle and the like. Specifically, for example, the data acquisition unit 102 includes a gyro sensor, an acceleration sensor, an inertial measurement device (IMU), a sensor and the like for detecting an accelerator pedal operation amount, a brake pedal operation amount, a steering wheel steering angle, an engine speed, a motor speed, a wheel rotation speed, or the like.

Further, for example, the data acquisition unit 102 includes various sensors for detecting the external information of the own vehicle. Specifically, for example, the data acquisition unit 102 includes an imaging device such as a time of flight (ToF) camera, a stereo camera, a monocular camera, an infrared camera, and another camera. Further, for example, the data acquisition unit 102 includes an environment sensor for detecting weather, meteorological phenomenon or the like, and an ambient information detection sensor for detecting an object around the own vehicle. For example, the environment sensor includes a raindrop sensor, a fog sensor, a sunshine sensor, a snow sensor, and the like. For example, the ambient information detection sensor includes an ultrasonic sensor, radar, light detection and ranging, laser imaging detection and ranging (LiDAR), sonar, and the like.

Further, for example, the data acquisition unit 102 includes various sensors for detecting the current position of the own vehicle. Specifically, for example, the data acquisition unit 102 includes a global navigation satellite system (GNSS) receiver which receives a GNSS signal from a GNSS satellite.

Further, for example, the data acquisition unit 102 includes various sensors for detecting the internal information of the vehicle. Specifically, for example, the data acquisition unit 102 includes an imaging device which images a driver, a biometric sensor which detects biometric information of the driver, and a microphone which collects sound in the vehicle interior. For example, the biometric sensor is provided in a seat surface, a steering wheel, or the like and detects biometric information of a passenger sitting on a seat or a driver holding the steering wheel.

The communication unit 103 communicates with the in-vehicle equipment 104 and various devices, a server, a base station, and the like outside the vehicle, transmits the data supplied from each unit of the vehicle control system 100, and supplies the received data to each unit of the vehicle control system 100. Incidentally, the communication protocol supported by the communication unit 103 is not particularly limited, and the communication unit 103 can support a plurality of types of communication protocols.

For example, the communication unit 103 performs wireless communication with the in-vehicle equipment 104 via wireless LAN, Bluetooth (registered trademark), near field communication (NFC), wireless USB (WUSB), or the like. Further, for example, the communication unit 103 performs wired communication with the in-vehicle equipment 104 via a connection terminal (not illustrated) (if necessary, a cable), with universal serial bus (USB), high-definition multimedia interface (HDMI) (registered trademark), mobile high-definition link (MHL), or the like.

Further, for example, the communication unit 103 communicates with equipment (for example, an application server or a control server) existing on an external network (for example, the Internet, a cloud network, or a network unique to a business operator) via a base station or an access point. Further, for example, the communication unit 103 communicates with a terminal (for example, a terminal of a pedestrian or a store or machine type communication (MTC) terminal) existing in the vicinity of the own vehicle by using peer to peer (P2P) technology. Further, for example, the communication unit 103 performs V2X communication such as vehicle-to-vehicle communication, vehicle-to-infrastructure communication, vehicle-to-home communication, and vehicle-to-pedestrian communication. Further, for example, the communication unit 103 includes a beacon receiving unit, receives radio waves or electromagnetic waves transmitted from a wireless station installed on the road or the like, and acquires information such as a current position, traffic congestion, traffic restrictions, and required time.

For example, the in-vehicle equipment 104 includes a mobile device or a wearable device possessed by the passenger, an information device which is carried in or attached to the own vehicle, and a navigation device which searches for a route to an arbitrary destination.

The output control unit 105 controls the output of various kinds of information to the passengers of the own vehicle or the outside of the vehicle. For example, the output control unit 105 generates an output signal including at least one of visual information (for example, image data) and auditory information (for example, audio data) and supplies the output signal to the output unit 106, so as to control the output of the visual information and the auditory information from the output unit 106. Specifically, for example, the output control unit 105 synthesizes the image data captured by different imaging devices of the data acquisition unit 102 to generate a bird's-eye image or a panoramic image, and supplies an output signal including the generated image to the output unit 106. Further, for example, the output control unit 105 generates audio data including a warning sound or a warning message for a danger such as collision, contact, or entry into a dangerous zone, and supplies an output signal including the generated audio data to the output unit 106.

The output unit 106 includes a device capable of outputting the visual information or the auditory information to the passengers of the own vehicle or the outside of the vehicle. For example, the output unit 106 includes a display device, an instrument panel, an audio speaker, a headphone, a wearable device such as a glasses-type display worn by a passenger, a projector, a lamp, and the like. In addition to a device having a normal display, the display device included in the output unit 106 may be a device, such as, a head-up display, a transmissive display, and a device having an augmented reality (AR) display function, which displays visual information in the visual field of the driver.

The drive system control unit 107 controls the drive system 108 by generating various control signals and supplying the control signals to the drive system 108. Further, the drive system control unit 107 supplies a control signal to each unit other than the drive system 108 as necessary to perform notification of the control state of the drive system 108 and the like.

The drive system 108 includes various devices related to the drive system of the own vehicle. For example, the drive system 108 includes a drive force generation device for generating a drive force of an internal combustion engine or a drive motor, a drive force transmission mechanism for transmitting the drive force to wheels, a steering mechanism for adjusting a steering angle, a braking device for generating a braking force, an antilock brake system (ABS), an electronic stability control (ESC), an electric power steering device, and the like.

The body system control unit 109 controls the body system 110 by generating various control signals and supplying the control signals to the body system 110. Further, the body system control unit 109 supplies a control signal to each unit other than the body system 110 as necessary to perform notification of the control state of the body system 110 and the like.

The body system 110 includes various body-type devices mounted on the vehicle body. For example, the body system 110 includes a keyless entry system, a smart key system, a power window device, a power seat, a steering wheel, an air conditioner, various lamps (for example, headlights, backlights, brake lights, blinkers, and fog lights), and the like.

For example, the storage unit 111 includes a magnetic storage device such as a read only memory (ROM), a random access memory (RAM), and a hard disc drive (HDD), a semiconductor storage device, an optical storage device, and a magneto-optical storage device. The storage unit 111 stores various programs and data used by each unit of the vehicle control system 100. For example, the storage unit 111 stores a map data such as a three-dimensional high-precision map such as a dynamic map, a global map which is less accurate than the high-precision map and covers a large area, and a local map including ambient information of the own vehicle.

The automatic driving control unit 112 controls automatic driving such as autonomous traveling or driving assistance. Specifically, for example, the automatic driving control unit 112 may perform cooperative control for the purpose of realizing functions of advanced driver assistance system (ADAS) including collision avoidance or shock mitigation of the own vehicle, follow-up traveling based on an inter-vehicle distance, vehicle speed maintenance traveling, collision warning of the own vehicle, lane departure warning of the own vehicle, and the like. Further, for example, the automatic driving control unit 112 performs cooperative control for the purpose of automatic driving of autonomously travelling without depending on the operation of the driver. The automatic driving control unit 112 includes the detection unit 131, the self-position estimation unit 132, the situation analysis unit 133, the planning unit 134, and the operation control unit 135.

The detection unit 131 detects various kinds of information necessary for controlling the automatic driving. The detection unit 131 includes a vehicle external information detection unit 141, a vehicle internal information detection unit 142, and a vehicle state detection unit 143.

The vehicle external information detection unit 141 performs a process of detecting the external information of the own vehicle on the basis of data or signals from each unit of the vehicle control system 100. For example, the vehicle external information detection unit 141 performs a detection process, a recognition process, and a tracking process for an object around the own vehicle and a detection process for a distance to the object. The object to be detected includes a vehicle, a person, an obstacle, a structure, a road, a traffic light, a traffic sign, a road marking, and the like. Further, for example, the vehicle external information detection unit 141 performs a process of detecting the surrounding environment of the own vehicle. For example, the surrounding environment to be detected includes weather, temperature, humidity, brightness, and road surface condition. The vehicle external information detection unit 141 supplies the data indicating the result of the detection process to the self-position estimation unit 132, a map analysis unit 151 of the situation analysis unit 133, a traffic rule recognition unit 152, a situation recognition unit 153, and an emergency avoidance unit 171 of the operation control unit 135.

The vehicle internal information detection unit 142 performs a process of detecting the internal information of the vehicle on the basis of data or signals from each unit of the vehicle control system 100. For example, the vehicle internal information detection unit 142 performs an authentication process and a recognition process for a driver, a detection process for a driver state, a detection process for a passenger, and a detection process for vehicle internal environment. For example, the driver state to be detected includes a physical condition, an arousal level, a concentration level, a fatigue level, and a line-of-sight direction. For example, the vehicle internal environment to be detected includes temperature, humidity, brightness, and odor. The vehicle internal information detection unit 142 supplies the data indicating the result of the detection process to the situation recognition unit 153 of the situation analysis unit 133, the emergency avoidance unit 171 of the operation control unit 135, and the like.

The vehicle state detection unit 143 performs a process of detecting the state of the own vehicle on the basis of the data or signals from each unit of the vehicle control system 100. For example, the own-vehicle state to be detected includes speed, acceleration, steering angle, the presence/absence and content of abnormality, the state of driving operation, the position and inclination of a power seat, the state of door lock, and the state of another on-vehicle equipment. The vehicle state detection unit 143 supplies the data indicating the result of the detection process to the situation recognition unit 153 of the situation analysis unit 133, the emergency avoidance unit 171 of the operation control unit 135, and the like.

The self-position estimation unit 132 performs an estimation process on the position and posture of the own vehicle on the basis of the data or signals from each unit, such as the vehicle external information detection unit 141 and the situation recognition unit 153 of the situation analysis unit 133, of the vehicle control system 100. Further, the self-position estimation unit 132 generates a local map (hereinafter referred to as a self-position estimation map) used for estimating the self-position as necessary. For example, the self-position estimation map is a highly accurate map using a technique such as simultaneous localization and mapping (SLAM). The self-position estimation unit 132 supplies the data indicating the result of the estimation process to the map analysis unit 151, the traffic rule recognition unit 152, the situation recognition unit 153, and the like of the situation analysis unit 133. Further, the self-position estimation unit 132 causes the storage unit 111 to store the self-position estimation map.

The situation analysis unit 133 performs an analysis process on the situation of the own vehicle and the surroundings. The situation analysis unit 133 includes the map analysis unit 151, the traffic rule recognition unit 152, the situation recognition unit 153, and a situation prediction unit 154.

The map analysis unit 151 performs an analysis process on the various map stored in the storage unit 111 and constructs the map including information necessary for automatic driving processing while using the data or signals from each unit, such as the self-position estimation unit 132 and the vehicle external information detection unit 141, of the vehicle control system 100 as necessary. The map analysis unit 151 supplies the constructed map to the traffic rule recognition unit 152, the situation recognition unit 153, the situation prediction unit 154, and a route planning unit 161, a behavior planning unit 162, an operation planning unit 163, and the like of the planning unit 134.

The traffic rule recognition unit 152 performs a recognition process on traffic rules around the own vehicle on the basis of the data or signals from each unit, such as the self-position estimation unit 132, the vehicle external information detection unit 141, and the map analysis unit 151, of the vehicle control system 100. With this recognition process, for example, the position and state of the signal around the own vehicle, the content of traffic regulation around the own vehicle, a travelable lane, and the like are recognized. The traffic rule recognition unit 152 supplies the data indicating the result of the recognition process to the situation prediction unit 154 and the like.

The situation recognition unit 153 performs a recognition process on the situation regarding the own vehicle on the basis of the data or signals from each unit, such as the self-position estimation unit 132, the vehicle external information detection unit 141, the vehicle internal information detection unit 142, the vehicle state detection unit 143, and the map analysis unit 151, of the vehicle control system 100. For example, the situation recognition unit 153 performs a recognition process on the situation of the own vehicle, the situation around the own vehicle, the situation of the driver of the own vehicle, and the like. Further, the situation recognition unit 153 generates a local map used for recognizing the situation around the own vehicle (hereinafter, referred to as a situation recognition map) as necessary. For example, the situation recognition map is an occupancy grid map.

For example, the situation of the own vehicle to be recognized includes the position, posture, movement (for example, speed, acceleration, and a moving direction) of the own vehicle, and the presence/absence and content of abnormality. For example, the surrounding situation of the own vehicle to be recognized includes the type and position of surrounding stationary objects, the type, position, and movement (for example, speed, acceleration, and a moving direction) of surrounding moving objects, the configuration and road surface condition of surrounding roads, and the surrounding weather, temperature, humidity, and brightness. For example, the driver state to be recognized includes a physical condition, an arousal level, a concentration level, a fatigue level, line-of-sight movement, and driving operation.

The situation recognition unit 153 supplies the data indicating the result of the recognition process (including the situation recognition map as necessary) to the self-position estimation unit 132, the situation prediction unit 154, and the like. Further, the situation recognition unit 153 stores the situation recognition map in the storage unit 111.

The situation prediction unit 154 performs a prediction process on the situation regarding the own vehicle on the basis of the data or signals from each unit, such as the map analysis unit 151, the traffic rule recognition unit 152, and the situation recognition unit 153, of the vehicle control system 100. For example, the situation prediction unit 154 performs a prediction process on the situation of the own vehicle, the surrounding situation of the own vehicle, the situation of the driver, and the like.

For example, the situation of the own vehicle to be predicted includes the behavior of the own vehicle, the occurrence of abnormality, and a travelable distance. For example, the surrounding situation of the own vehicle to be predicted includes the behavior of a moving object around the own vehicle, a change in the state of a signal, and a change in the environment such as weather. For example, the situation of the driver to be predicted includes the behavior and physical condition of the driver.

The situation prediction unit 154 supplies the data indicating the result of the prediction process together with the data from the traffic rule recognition unit 152 and the situation recognition unit 153 to the route planning unit 161, the behavior planning unit 162, the operation planning unit 163, and the like of the planning unit 134.

The route planning unit 161 plans a route to the destination on the basis of the data or signals from each unit, such as the map analysis unit 151 and the situation prediction unit 154, of the vehicle control system 100. For example, the route planning unit 161 sets a route from the current position to the designated destination on the basis of the global map. Further, for example, the route planning unit 161 appropriately changes the route on the basis of traffic congestion, accidents, traffic restriction, situations such as construction, and the physical condition of the driver. The route planning unit 161 supplies the data indicating the planned route to the behavior planning unit 162 and the like.

The behavior planning unit 162 plans the behavior of the own vehicle to safely travel the route planned by the route planning unit 161 within the planned time on the basis of the data or signals from each unit, such as the map analysis unit 151 and the situation prediction unit 154, of the vehicle control system 100. For example, the behavior planning unit 162 makes a plan such as start, stop, a traveling direction (for example, forward, backward, left turn, right turn, and direction change), a traveling lane, a traveling speed, and overtaking. The behavior planning unit 162 supplies the data indicating the planned behavior of the own vehicle to the operation planning unit 163 and the like.

The operation planning unit 163 plans the operation of the own vehicle to realize the behavior planned by the behavior planning unit 162 on the basis of the data or signals from each unit, such as the map analysis unit 151 and the situation prediction unit 154, of the vehicle control system 100. For example, the operation planning unit 163 makes a plan of acceleration, deceleration, traveling track, and the like. The operation planning unit 163 supplies the data indicating the planned operation of the own vehicle to an acceleration/deceleration control unit 172, a direction control unit 173, and the like of the operation control unit 135.

The operation control unit 135 controls the operation of the own vehicle. The operation control unit 135 includes the emergency avoidance unit 171, the acceleration/deceleration control unit 172, and the direction control unit 173.

On the basis of the detection results of the vehicle external information detection unit 141, the vehicle internal information detection unit 142, and the vehicle state detection unit 143, the emergency avoidance unit 171 performs a detection process for emergency such as collision, contact, entry into a danger zone, driver abnormality, and vehicle abnormality. In a case where the occurrence of emergency is detected, the emergency avoidance unit 171 plans an operation, such as a sudden stop or a sharp turn, of the own vehicle to avoid the emergency. The emergency avoidance unit 171 supplies the data indicating the planned operation of the own vehicle to an acceleration/deceleration control unit 172, a direction control unit 173, and the like.

The acceleration/deceleration control unit 172 performs acceleration/deceleration control for realizing the operation of the own vehicle planned by the operation planning unit 163 or the emergency avoidance unit 171. For example, the acceleration/deceleration control unit 172 calculates the control target value of the drive force generation device or the braking device for realizing the planned acceleration, deceleration, or sudden stop, and supplies the control command indicating the calculated control target value to the drive system control unit 107.

The direction control unit 173 performs direction control for realizing the operation of the own vehicle planned by the operation planning unit 163 or the emergency avoidance unit 171. For example, the direction control unit 173 calculates the control target value of the steering mechanism for realizing the planned traveling track or sharp turn by the operation planning unit 163 or the emergency avoidance unit 171, and supplies the control command indicating the calculated control target value to the drive system control unit 107.

4. MODIFICATION

In the above-described embodiment, the information processing device 10 generates an integrated map (bird's-eye view map) on the basis of the image captured by the own imaging unit 13. However, the information processing device 10 may generate an integrated map (bird's-eye view map) on the basis of the image captured by another device. At this time, the other device may be the information processing device 10 or the imaging device mounted on a preceding vehicle (for example, a moving body 2) or may be an imaging device installed on a road.

Specifically, the acquisition unit 181 of the information processing device 10 acquires the image captured by the imaging unit 13 of the other device (another moving body). Then, the recognition unit 182 recognizes the attribute of the object shown in the image captured by the imaging unit 13 of the other device (another moving body). Further, the generation unit 183 generates an integrated map (bird's-eye view map) on the basis of the image captured by the imaging unit 13 of the other device and the attributes of the object. Accordingly, the user can know the existence of dirt which cannot be seen from the moving body 1 on which the user rides. As a result, the user can give an avoidance instruction with a margin.

In the above-described embodiment, the information processing device 10 displays a bird's-eye view map on the own display unit 17a. However, the information processing device 10 may include a transmission unit which transmits information to another device (for example, the information processing device 10 mounted on the preceding vehicle), and may transmit the integrated map (bird's-eye view map) generated by the generation unit 183 to the other device. At this time, the transmission unit may be the communication unit 11 or the setting unit 186. Accordingly, it is possible to notify the user using the other device of the existence of dirt. The user of the other device can easily give an avoidance instruction on the basis of the integrated map (bird's-eye view map).

Incidentally, in a case where there is an object which cannot be recognized by the recognition unit 182 in the bird's-eye view map, the transmission unit may transmit the bird's-eye view map to the other device. Further, in a case where there is an object having a predetermined attribute in the bird's-eye view map, the transmission unit may transmit the bird's-eye view map to the other device. The predetermined attribute can be arbitrarily set by the user, the designer of the information processing device 10, or the like. The user using the other device can know the existence of dirt or the like at an early stage.

The control device which controls the information processing device 10 or the vehicle control system 100 of this embodiment may be realized by a dedicated computer system or a general-purpose computer system.

For example, a communication program for executing the above-described operations (for example, a communication control process, an adjustment process, and a distribution process) is stored and distributed in a computer-readable recording medium such as an optical disk, a semiconductor memory, a magnetic tape, and a flexible disk. Then, for example, the control device is configured by installing the program in a computer and executing the above-described processes. At this time, the control device may be an external device (for example, a personal computer) of the information processing device 10 or the vehicle control system 100. Further, the control device may be an internal device (for example, the control unit 18 or the automatic driving control unit 112) of the information processing device 10 or the vehicle control system 100.

Further, the communication program may be stored in a disk device included in a server device on a network such as the Internet so as to be downloaded to a computer. Further, the above-described functions may be realized by cooperation between an operating system (OS) and application software. In this case, the part other than the OS may be stored and distributed in a medium, and the part other than the OS may be stored in the server device, so as to be downloaded to a computer.

Further, among the processes described in the above embodiment, all or part of the processes described as being automatically performed may be manually performed, or all or part of the processes described as being manually performed may be automatically performed by a known method. In addition, the processing procedures, specific names, information including various data and parameters shown in the above-described specification and drawings may be arbitrarily changed unless otherwise specified. For example, the various information shown in each drawing is not limited to the illustrated information.

Each constituent element of each device shown in the drawings is functionally conceptual, and does not necessarily have to be physically configured as illustrated. That is, the specific form of distribution/integration of each device is not limited to the illustrated one, and all or part of the device may be configured to be functionally or physically distributed/integrated in arbitrary units according to various loads, usage conditions, and the like.

Further, the above-described embodiments can be appropriately combined in an area in which the processing contents do not contradict each other. Further, the order of each step shown in the sequence diagram or the flowchart of this embodiment may be changed as appropriate.

5. CONCLUSION

As described above, according to an embodiment of the present disclosure, the information processing device 10 generates a bird's-eye view map showing the attributes of the object on the basis of the image captured by the imaging unit 13 and the information on the object attributes recognized by the recognition unit 182. Accordingly, the user can easily grasp the situation for instructing the operation of the moving body. As a result, the user can easily instruct the operation of the moving body.

Although the embodiments of the present disclosure have been described above, the technical scope of the present disclosure is not limited to the above-described embodiments as they are, and various modifications may be made without departing from the gist of the present disclosure. Further, the component may be combined suitably over different embodiment and the modification.

The effects in each embodiment described in this description are merely examples and are not limited, and other effects may be present.

Incidentally, this technology may also be configured as below.

(1)

An information processing device comprising:
  an acquisition unit that acquires an image captured by an imaging unit;
  a recognition unit that recognizes attributes of an object shown in the image captured by the imaging unit; and
  a generation unit that generates a bird's-eye view map showing the attributes of the object on a basis of the image captured by the imaging unit and information on the attributes of the object recognized by the recognition unit.

(2)

The information processing device according to (1), further comprising:
  a measuring unit that measures a distance to the object, wherein
  the generation unit generates the bird's-eye view map showing the attributes of the object on the basis of the image captured by the imaging unit and a measurement result of the measuring unit.

(3)

The information processing device according to (2), wherein the generation unit generates the bird's-eye view map by integrating a first bird's-eye view map which is generated on a basis of the image captured by the imaging unit and a second map which is generated on the basis of the measurement result of the measuring unit and in which the attributes of the object are shown to be recognizable.

(4)

The information processing device according to (3), wherein the generation unit acquires, as the first map, a texture map in which a texture of the image captured by the imaging unit is mapped on a plane.

(5)

The information processing device according to (3), wherein the generation unit acquires, as the second map, a grid map in which an image showing the attributes of the object is arranged in a bird's-eye view on the basis of a position of the object recognized on the basis of the measurement result of the measuring unit.

(6)

The information processing device according to any one of (1) to (5), comprising:
  a display unit that displays the bird's-eye view map; and
  a setting unit that sets a route on the basis of an instruction of a user using the bird's-eye view map displayed on the display unit.

(7)

The information processing device according to (6), wherein
the display unit displays the route set by the setting unit on the bird's-eye view map.

(8)

The information processing device according to (6), comprising:
an input unit that inputs the instruction using the bird's-eye view map, wherein
the setting unit sets a route on the basis of on the instruction input to the input unit.

(9)

The information processing device according to (8), wherein
in the input unit, the user is capable of inputting an avoidance instruction for avoiding a predetermined position displayed on the bird's-eye view map, and
the setting unit sets a route so as to avoid the position indicated by the avoidance instruction.

(10)

The information processing device according to (6), wherein
the display unit displays an image showing a current route on the bird's-eye view map,
the acquisition unit acquires input of the user for changing the current route, and
the setting unit changes the current route to another route on the basis of the input of the user.

(11)

The information processing device according to any one of (1) to (10), wherein
the acquisition unit acquires an image captured by the imaging unit of another device,
the recognition unit recognizes attributes of an object shown in the image captured by the imaging unit of the other device, and
the generation unit generates the bird's-eye view map on the basis of the image captured by the imaging unit of the other device and the attributes of the object.

(12)

The information processing device according to any one of (1) to (11), comprising:
a transmission unit that transmits the bird's-eye view map to another device.

(13)

The information processing device according to (12), wherein
the transmission unit transmits the bird's-eye view map to the other device in a case where there is an object which is not capable of being recognized by the recognition unit in the bird's-eye view map.

(14)

The information processing device according to (12), wherein
the transmission unit transmits the bird's-eye view map to the other device in a case where there is an object having a predetermined attribute in the bird's-eye view map.

(15)

The information processing device according to (2), wherein
the measuring unit is a depth sensor.

(16)

An information processing method comprising:
acquiring an image captured by an imaging unit;
recognizing attributes of an object shown in the image captured by the imaging unit; and
generating a bird's-eye view map showing the attributes of the object on a basis of the image captured by the imaging unit and the recognized attributes of the object.

(17)

An information processing program for causing
a computer to function as:
an acquisition unit that acquires an image captured by an imaging unit;
a recognition unit that recognizes attributes of an object shown in the image captured by the imaging unit; and
a generation unit that generates a bird's-eye view map showing the attributes of the object on a basis of the image captured by the imaging unit and information on the attributes of the object recognized by the recognition unit.

(18)

A moving body comprising:
an acquisition unit that acquires an image captured by an imaging unit;
a recognition unit that recognizes attributes of an object shown in the image captured by the imaging unit; and
a generation unit that generates a bird's-eye view map showing the attributes of the object on a basis of the image captured by the imaging unit and information on the attributes of the object recognized by the recognition unit.

(19)

The moving body according to (18), wherein
the acquisition unit acquires an image captured by the imaging unit of another moving body,
the recognition unit recognizes attributes of an object shown in the image of the other moving body, and
the generation unit generates the bird's-eye view map on the basis of the image captured by the imaging unit and information on the attributes of the object recognized by the recognition unit.

(20)

The moving body according to (18) or (19), comprising:
a transmission unit that transmits the bird's-eye view map to another moving body.

REFERENCE SIGNS LIST 1, 2 MOVING BODY
10 INFORMATION PROCESSING DEVICE
11 COMMUNICATION UNIT
12 STORAGE UNIT
13 IMAGING UNIT
14 MEASURING UNIT
15 RECEIVING UNIT
16 INPUT UNIT
17 OUTPUT UNIT
17a DISPLAY UNIT
18 CONTROL UNIT
18a to 18j BLOCK
181 ACQUISITION UNIT
182 RECOGNITION UNIT
183 GENERATION UNIT
184 TRACKING UNIT
185 CALCULATION UNIT
186 SETTING UNIT
187 MOVEMENT CONTROL UNIT
100 VEHICLE CONTROL SYSTEM
105 OUTPUT CONTROL UNIT
112 AUTOMATIC DRIVING CONTROL UNIT

The invention claimed is:

1. A first information processing device, comprising:
an acquisition unit configured to acquire a first image captured by a first imaging unit, wherein the first image includes a first object;
a recognition unit configured to recognize attributes of the first object in the first image; and
a generation unit configured to generate a bird's-eye view map based on the first image and information on the recognized attributes of the first object, wherein the bird's-eye view map indicates the attributes of the first object.

2. The first information processing device according to claim 1, further comprising a measuring unit configured to measure a distance to the first object to obtain a measurement result, wherein
the generation unit is further configured to generate the bird's-eye view map based on the first image and the measurement result.

3. The first information processing device according to claim 2, wherein the generation unit is further configured to:
generate a first map based on the first image;
generate a second map based on the measurement result, wherein the attributes of the first object are recognizable in the second map; and
integrate the first map and the second map to generate the bird's-eye view map.

4. The first information processing device according to claim 3, wherein the generation unit is further configured to acquire, as the first map, a texture map in which a texture of the first image is mapped on a plane.

5. The first information processing device according to claim 3, wherein
the recognition unit is further configured to recognize a position of the first object based on the measurement result,
the generation unit is further configured to acquire, as the second map, a grid map that includes an image in a bird's-eye view,
the image in the grid map shows the attributes of the first object, and
the grid map is acquired based on the recognized position of the first object.

6. The first information processing device according to claim 1, comprising:
a display unit configured to display the bird's-eye view map; and
a setting unit configured to:
receive, based on the displayed bird's-eye view map, information of a user instruction; and
set a route based on the received information of the user instruction.

7. The first information processing device according to claim 6, wherein the display unit is further configured to display the set route on the bird's-eye view map.

8. The first information processing device according to claim 6, comprising an input unit configured to receive, as an input, the user instruction based on the bird's-eye view map, wherein the setting unit is further configured to set the route based on the input.

9. The first information processing device according to claim 8, wherein
the input unit is further configured to receive, as the input, an avoidance instruction to avoid a position on the bird's-eye view map, and the setting unit is further configured to set the route to avoid the position indicated by the avoidance instruction.

10. The first information processing device according to claim 6, wherein
the display unit is further configured to display an image that displays a current route on the bird's-eye view map,
the acquisition unit is further configured to acquire a user input to change the current route, and
the setting unit is further configured to change the current route based on the user input.

11. The first information processing device according to claim 1, wherein
the acquisition unit is further configured to acquire a second image captured by a second imaging unit of a second information processing device,
the second image includes a second object,
the recognition unit is further configured to recognize attributes of the second object in the second image, and
the generation unit is further configured to generate the bird's-eye view map based on the second image and the attributes of the second object.

12. The first information processing device according to claim 1, further comprising a transmission unit configured to transmit the bird's-eye view map to a second information processing device.

13. The first information processing device according to claim 12, wherein the transmission unit is further configured to transmit the bird's-eye view map to the second information processing device in a case where there is an unrecognizable object which is unrecognizable in the bird's-eye view map.

14. The first information processing device according to claim 12, wherein the transmission unit is further configured to transmit the bird's-eye view map to the second information processing device in a case where there is a second object having a determined attribute in the bird's-eye view map.

15. The first information processing device according to claim 2, wherein the measuring unit is a depth sensor.

16. An information processing method, comprising:
acquiring an image that includes an object;
recognizing attributes of the object in the image; and
generating a bird's-eye view map based on the image and the recognized attributes of the object, wherein the bird's-eye view map indicates the attributes of the object.

17. A non-transitory computer-readable medium having stored thereon computer-executable instructions that, when executed by a processor, cause the processor to execute operations, the operations comprising:
acquiring an image that includes an object;
recognizing attributes of the object in the image; and
generating a bird's-eye view map based on the image and information on the recognized attributes of the object, wherein the bird's-eye view map indicates the attributes of the object.

18. A first moving body, comprising:
an acquisition unit configured to acquire a first image captured by a first imaging unit, wherein the first image includes a first object;
a recognition unit configured to recognize attributes of the first object in the first image; and
a generation unit configured to generate a bird's-eye view map based on the first image and information on the recognized attributes of the first object, wherein the bird's-eye view map indicates the attributes of the first object.

19. The first moving body according to claim 18, wherein the acquisition unit is further configured to acquire a second image captured by a second imaging unit of a second moving body,
the second image includes a second object,
the recognition unit is further configured to recognize attributes of the second object in the second image of the second moving body, and
the generation unit is further configured to generate the bird's-eye view map based on the second image and information on the attributes of the second object.

20. The first moving body according to claim 18, further comprising a transmission unit configured to transmit the bird's-eye view map to a second moving body.

* * * * *